United States Patent
Jassal et al.

(10) Patent No.: US 11,764,905 B2
(45) Date of Patent: Sep. 19, 2023

(54) METHODS, APPARATUS, AND SYSTEMS FOR HYBRID AUTOMATIC REPEAT REQUEST (HARQ) RETRANSMISSIONS BASED ON USER EQUIPMENT (UE) COOPERATION

(71) Applicants: Aman Jassal, Kanata (CA); Hua Xu, Ottawa (CA); Liqing Zhang, Ottawa (CA)

(72) Inventors: Aman Jassal, Kanata (CA); Hua Xu, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/840,746

(22) Filed: Apr. 6, 2020

(65) Prior Publication Data
US 2021/0328725 A1 Oct. 21, 2021

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/1822* (2013.01); *H04L 1/1887* (2013.01); *H04L 2001/0097* (2013.01)

(58) Field of Classification Search
CPC ........... H04L 1/1854; H04L 2001/0097; H04L 1/1819; H04L 1/1896; H04L 5/0055; H04L 1/189; H04L 1/1887; H04L 5/0044; H04L 1/0038; H04L 1/1812; H04L 1/1822; H04W 72/0446; H04W 72/042; H04W 72/0493; H04W 84/047; H04W 88/04; H04B 7/15592; H04B 7/2606; H03M 13/2957; H03M 13/6525; H03M 13/6306; H03M 13/09
See application file for complete search history.

(56) References Cited

U.S. PATENT DOCUMENTS 9,172,512 B2    10/2015   Maaref et al.
2010/0246721 A1*  9/2010   Chen ................... H04L 5/0053
                                                 375/316
(Continued)

OTHER PUBLICATIONS

3GPP TS 38.213, "Technical Specification Group Radio Access Network;" Physical layer procedures for control, 3GPP TS 38.213, V.16.0.0, Release 16, Dec. 2019, 146 pages.
(Continued)

*Primary Examiner* — Yee F Lam

(57) ABSTRACT

Hybrid Automatic Repeat Request (HARQ) retransmissions based on User Equipment (UE) cooperation involves a first UE receiving a transmission comprising a data block that is destined for a second UE, and transmitting the data block toward the second UE according to a data block retransmission mechanism to enable the second UE to identify the data block transmitted from the first UE as being one of a plurality of concurrent transmissions of the data block according to the data block retransmission mechanism. The concurrent transmissions of the data block are processable by the second UE in combination to determine a reception status of the data block.

22 Claims, 19 Drawing Sheets

(51) Int. Cl.
  *H04L 1/1812* (2023.01)
  *H04L 1/1822* (2023.01)
  *H04L 1/1867* (2023.01)

(56) References Cited

U.S. PATENT DOCUMENTS

| | | | | |
|---|---|---|---|---|
| 2010/0275083 | A1* | 10/2010 | Nam | H03M 13/6525 |
| | | | | 714/748 |
| 2011/0064159 | A1* | 3/2011 | Ko | H04B 7/04 |
| | | | | 375/267 |
| 2013/0084795 | A1* | 4/2013 | Van Phan | H04W 84/047 |
| | | | | 455/15 |
| 2013/0258978 | A1* | 10/2013 | Aiba | H03M 13/6356 |
| | | | | 370/329 |
| 2015/0029972 | A1* | 1/2015 | Park | H04L 1/1812 |
| | | | | 370/329 |
| 2015/0063250 | A1* | 3/2015 | Lahetkangas | H04L 1/1812 |
| | | | | 370/329 |
| 2016/0381711 | A1 | 12/2016 | Kim et al. | |
| 2017/0208638 | A1 | 7/2017 | Baghel et al. | |
| 2017/0310427 | A1 | 10/2017 | Wakabayashi et al. | |
| 2018/0035435 | A1* | 2/2018 | Gupta | H04L 5/0092 |
| 2018/0035448 | A1* | 2/2018 | Gupta | H04W 72/0446 |
| 2018/0317213 | A1* | 11/2018 | Islam | H04L 1/1864 |
| 2019/0044663 | A1* | 2/2019 | Rosa | H04L 1/1809 |
| 2019/0140731 | A1 | 5/2019 | Mohan et al. | |
| 2019/0229853 | A1 | 7/2019 | Lee et al. | |
| 2020/0036485 | A1* | 1/2020 | Froberg Olsson | H04L 5/0055 |
| 2020/0336253 | A1* | 10/2020 | He | H04W 4/40 |
| 2021/0083832 | A1* | 3/2021 | Zhou | H04W 72/042 |
| 2021/0219268 | A1* | 7/2021 | Li | H04W 72/20 |
| 2021/0360603 | A1* | 11/2021 | Wang | H04L 5/0094 |
| 2021/0400704 | A1* | 12/2021 | Xue | H04W 72/21 |
| 2021/0409166 | A1* | 12/2021 | Wang | H04L 1/1896 |
| 2021/0410178 | A1* | 12/2021 | Wang | H04W 72/0446 |

OTHER PUBLICATIONS

3GPP TS 38.214, "Technical Specification Group Radio Access Network;" Physical layer procedures for data, 3GPP TS 38.214, V.16.0.0, Release 16, Dec. 2019, 147 pages.

3GPP TS 38.331, "Technical Specification Group Radio Access Network;" Radio resource control (RRC) Protocol specification, 3GPP TS 38.331, V.15.8.0, Release 15, Dec. 2019, 532 pages.

* cited by examiner

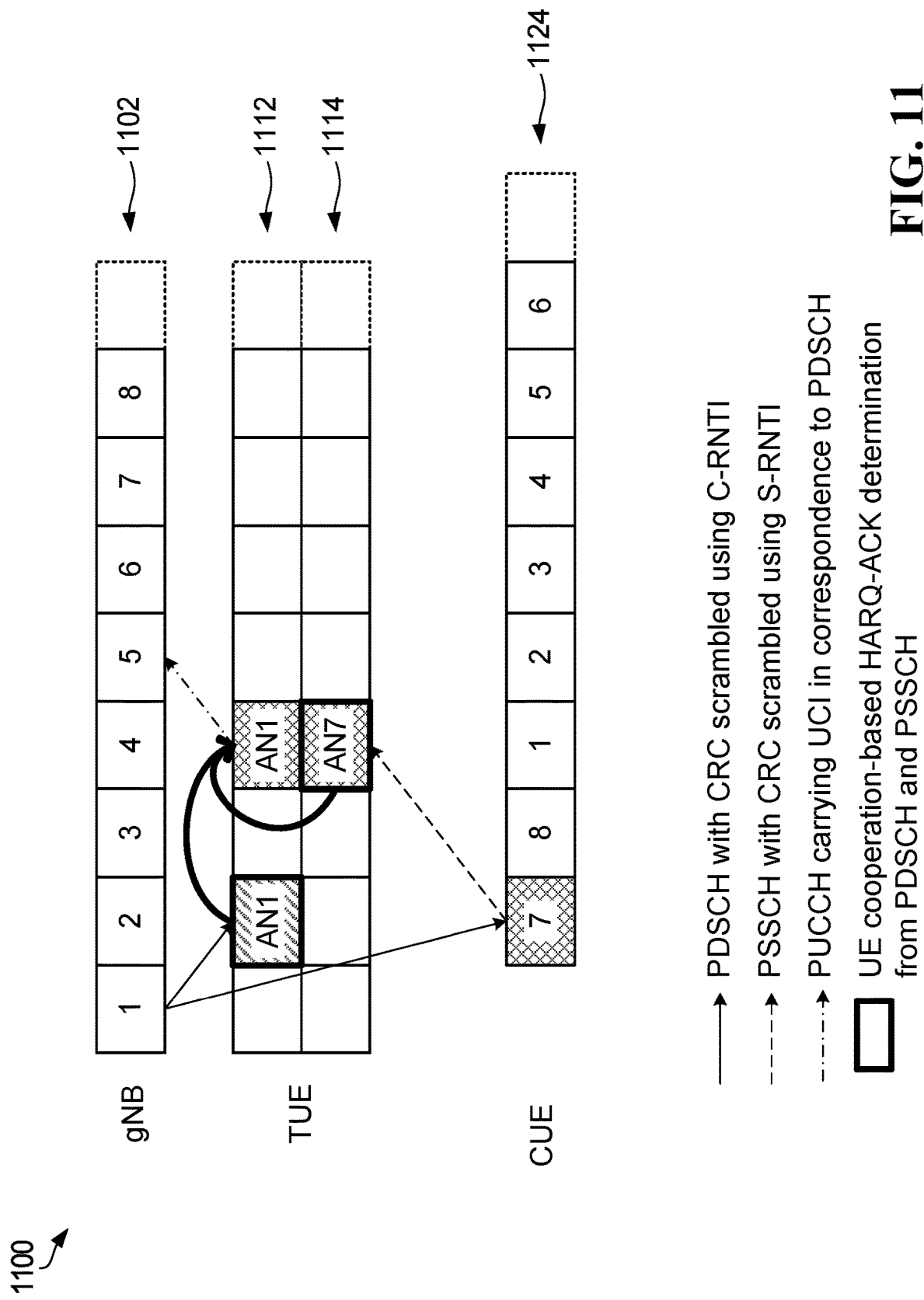

METHODS, APPARATUS, AND SYSTEMS FOR HYBRID AUTOMATIC REPEAT REQUEST (HARQ) RETRANSMISSIONS BASED ON USER EQUIPMENT (UE) COOPERATION

FIELD

This application relates generally to communications in a wireless communication network, and in particular to communications that involve Hybrid Automatic Repeat Request (HARQ) and User Equipment (UE) cooperation.

BACKGROUND

In Long Term Evolution (LTE), Device to Device (D2D) techniques in which UEs communicate directly with each other were studied and specified. Research focus in LTE D2D was primarily on the communications between the D2D devices. For New Radio (NR) Vehicle to anything (V2X) scenarios, D2D-related research is focused on "Uu link" transmissions between a gNodeB (gNB) and UEs, and on sidelink (SL) transmissions between UEs.

UE cooperation is a communication technique that focuses on cooperative procedures among UEs in a group of UEs, and can benefit scenarios such as V2X, as well as others such as enhanced Mobile Broadband (eMBB) and Ultra-Reliable Low Latency Communication (URLLC). UE cooperation may be achieved by a group of UEs helping each other with either or both of Uu link transmissions and sidelink transmissions, and involves interactions among the UEs in a group for the purpose of transmission and reception.

Current data block retransmission solutions deployed in cellular networks are based on HARQ protocol mechanisms, which are in turn based on ARQ. ARQ protocols are error-control methods for data transmission based on a stop-and-wait protocol model in which a transmitter waits until it has received an acknowledgement (ACK) from a receiver before transmitting a new data block or retransmits a previous data block if it receives a negative acknowledgement (NACK) from the receiver.

In HARQ protocol, ARQ protocols are combined with Forward Error Correction (FEC). Data bits of a data block are encoded along with redundancy bits and transmitted as a coded data block. Before the ARQ procedure, a receiver will attempt to decode the coded data block. HARQ allows a receiver to constructively combine different (re)transmissions of a given data block in order to reduce the overall number retransmission attempts.

Such HARQ retransmission mechanisms can still be time-consuming and inefficient. For example, HARQ protocol relies on time-based retransmissions of packets received in error, and retransmissions have to be scheduled by the network. Retransmissions are also usually limited in number, so that only a certain number of retransmission attempts can be made.

More efficient and timely retransmission mechanisms may be desirable.

SUMMARY

The present disclosure encompasses aspects of data block retransmission based on UE cooperation and corresponding UE behavior. UE cooperation-based data block retransmission mechanisms enable cooperative or helper UEs to retransmit data blocks destined to a given target UE, without being limited by typical HARQ constraints on retransmission timing and the number of retransmissions.

One aspect of the present disclosure relates to a method that involves receiving, by a first UE in a wireless communication network, a transmission comprising a data block that is destined for a second UE in the wireless communication network; and transmitting the data block toward the second UE according to a data block retransmission mechanism to enable the second UE to identify the data block transmitted from the first UE as being one of a plurality of concurrent transmissions of the data block according to the data block retransmission mechanism. The concurrent transmissions of the data block are processable by the second UE in combination to determine a reception status of the data block.

Another aspect of the present disclosure relates to a computer program product comprising a non-transitory computer readable storage medium storing programming. The programming includes instructions to perform such a method, which involves receiving, by a first UE in a wireless communication network, a transmission comprising a data block that is destined for a second UE in the wireless communication network; and transmitting the data block toward the second UE according to a data block retransmission mechanism to enable the second UE to identify the data block transmitted from the first UE as being one of a plurality of concurrent transmissions of the data block according to the data block retransmission mechanism. The concurrent transmissions of the data block are processable by the second UE in combination to determine a reception status of the data block.

An apparatus according to another aspect of the present disclosure includes a communication interface; processor, coupled to the communication interface; and a non-transitory computer readable storage medium, coupled to the processor, storing programming for execution by the processor. The programming includes instructions to perform a method that involves receiving, by a first UE in a wireless communication network, a transmission comprising a data block that is destined for a second UE in the wireless communication network; and transmitting the data block toward the second UE according to a data block retransmission mechanism to enable the second UE to identify the data block transmitted from the first UE as being one of a plurality of concurrent transmissions of the data block according to the data block retransmission mechanism. As in other embodiments described herein, the concurrent transmissions of the data block are processable by the second UE in combination to determine a reception status of the data block.

Another method involves receiving, by a second UE from a first UE and at least one other transmitter in a wireless communication network, a plurality of concurrent transmissions of a data block according to a data block retransmission mechanism; and determining, by the second UE, reception status of the data block based on processing of the plurality of concurrent transmissions in combination.

A further aspect of the present disclosure relates to a computer program product comprising a non-transitory computer readable storage medium storing programming. The programming includes instructions to perform such a method, which involves receiving, by a second UE from a first UE and at least one other transmitter in a wireless communication network, a plurality of concurrent transmissions of a data block according to a data block retransmission mechanism; and determining, by the second UE, reception status of the data block based on processing of the plurality of concurrent transmissions in combination.

An apparatus according to another aspect of the present disclosure includes a communication interface; processor, coupled to the communication interface; and a non-transitory computer readable storage medium, coupled to the processor, storing programming for execution by the processor. The programming includes instructions to perform a method that involves receiving, by a second UE from a first UE and at least one other transmitter in a wireless communication network, a plurality of concurrent transmissions of a data block according to a data block retransmission mechanism; and determining, by the second UE, reception status of the data block based on processing of the plurality of concurrent transmissions in combination.

In another embodiment, a method involves determining, by network equipment in a wireless communication network that further comprises a first UE and a second UE, that a data block is to be transmitted to the second UE; and concurrently transmitting the data block to at least the first UE and the second UE according to a data block retransmission mechanism to enable the second UE to identify the data block transmitted from the first UE and from the network equipment as being a plurality of concurrent transmissions of the data block according to the data block retransmission mechanism. The concurrent transmissions of the data block are processable by the second UE in combination to determine a reception status of the data block.

Another aspect of the present disclosure relates to a computer program product comprising a non-transitory computer readable storage medium storing programming. The programming includes instructions to perform such a method, which involves determining, by network equipment in a wireless communication network that further comprises a first UE and a second UE, that a data block is to be transmitted to the second UE; and concurrently transmitting the data block to at least the first UE and the second UE according to a data block retransmission mechanism to enable the second UE to identify the data block transmitted from the first UE and from the network equipment as being a plurality of concurrent transmissions of the data block according to the data block retransmission mechanism. The concurrent transmissions of the data block are processable by the second UE in combination to determine a reception status of the data block.

An apparatus according to another aspect of the present disclosure includes a communication interface; processor, coupled to the communication interface; and a non-transitory computer readable storage medium, coupled to the processor, storing programming for execution by the processor. The programming includes instructions to perform a method that involves determining, by network equipment in a wireless communication network that further comprises a first UE and a second UE, that a data block is to be transmitted to the second UE; and concurrently transmitting the data block to at least the first UE and the second UE according to a data block retransmission mechanism to enable the second UE to identify the data block transmitted from the first UE and from the network equipment as being a plurality of concurrent transmissions of the data block according to the data block retransmission mechanism. The concurrent transmissions of the data block are processable by the second UE in combination to determine a reception status of the data block.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 11 is a block diagram illustrating data block retransmission according to yet another embodiment;

DETAILED DESCRIPTION

As noted above, the present disclosure encompasses aspects of data block retransmission based on UE cooperation and corresponding UE behaviors. UE cooperation behaviors may involve aspects of Physical Downlink Control Channel (PDCCH) monitoring and determination based on any of various parameters or resources, such as HARQ entity, HARQ process, slot, beam, etc.

In some embodiments, data block retransmission based on UE cooperation uses a sidelink mechanism for retransmission, instead of relying on a FEC+ARQ protocol. With coordination of (re)transmissions between a Uu link and one or more sidelinks, a UE can receive different (re)transmissions, from one or more sidelinks or from the Uu link and one or more sidelinks. Target UEs can be in-coverage and visible to network equipment, or out-of-coverage and not visible to the network equipment.

Considering an in-coverage target UE and a Uu link/sidelink scenario as an example, UE cooperation behavior at the target UE can include the following: the target UE monitoring PDCCH on the Uu link; the target UE monitoring Physical Sidelink Control Channel (PSCCH) on one or more sidelinks; the target UE assuming that a Transport Block (TB) scheduled by PDCCH and PSCCH is the same; and the target UE reporting ACK/NACK feedback on Physical Uplink Control Channel (PUCCH) on the Uu link based on successful reception of the TB by combining the TBs received from Physical Downlink Shared Channel (PDSCH) and Physical Sidelink Shared Channel (PSSCH).

These and other features are described in further detail herein.

Figure 1:
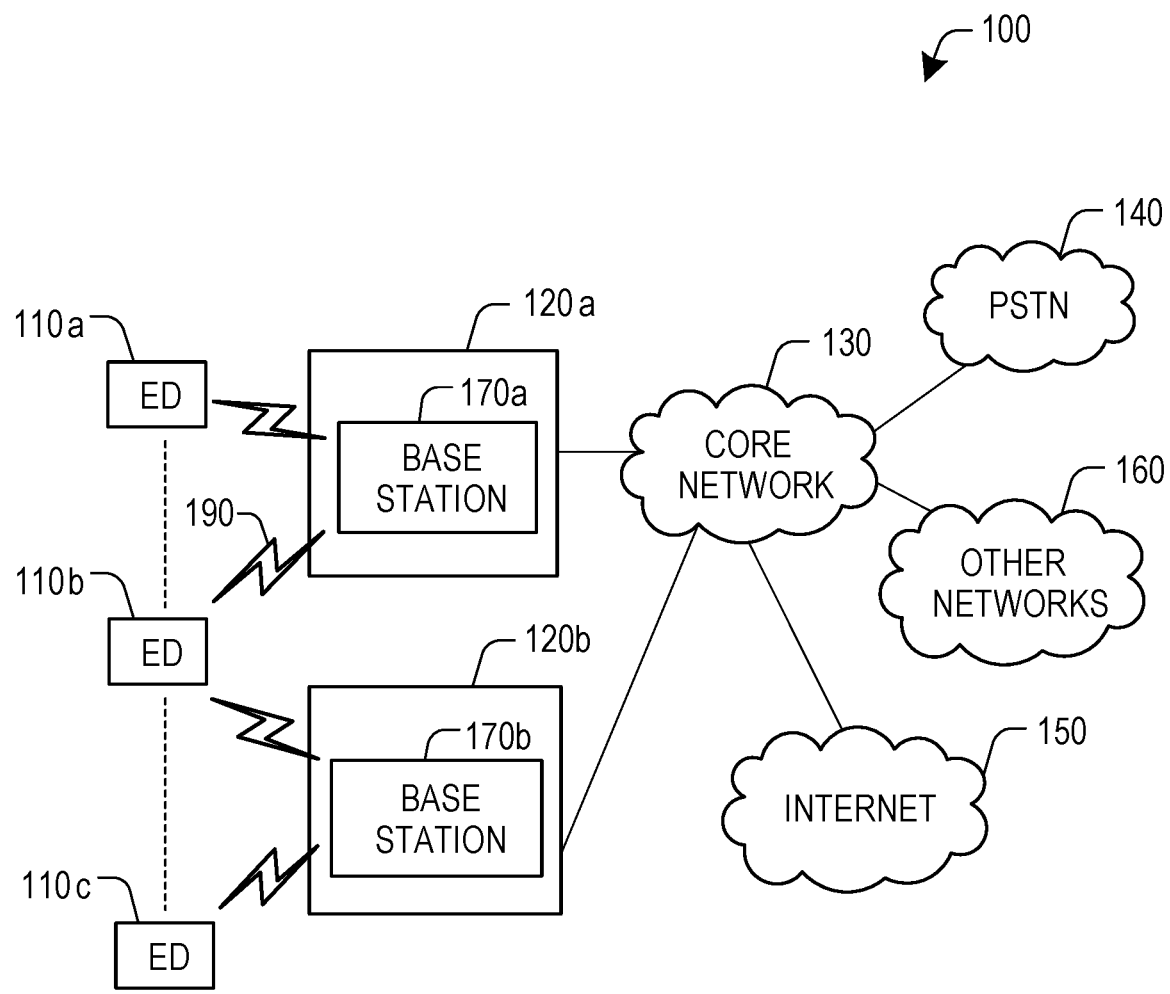
FIG. 1 illustrates an example communication system in which aspects of the present disclosure are implemented in some embodiments.

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a UE, Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several well-known devices, such as a Base Transceiver Station (BTS), a Node-B (NodeB), an evolved NodeB (eNodeB), a Home eNodeB, a gNB (next generation NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, μWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

An antenna port is defined such that the channel over which a symbol of the antenna port is conveyed can be inferred from the channel over which another symbol of the same antenna port is conveyed. An antenna beam, or more simply a beam, is typically defined as a form of spatial filter that is applied upon the transmission of a signal on a physical antenna element. Base stations and other transmitters on the network side may apply some of form spatial filtering, for coverage purposes for example, in a manner that is transparent to the UE. UEs are typically configured to monitor and receive reference signals that map onto one or more antenna ports, and network elements such as base stations transmit such antenna ports using different antenna beams in a manner that is transparent to the UE. Features that are disclosed herein with reference to antenna ports are also applicable to antenna beams, and similarly features that are disclosed herein with reference to antenna beams are also applicable to antenna ports.

Direct communications between UEs such as the EDs 110a-110c in FIG. 1 are also possible, and are represented by dashed lines in FIG. 1. UEs communicate with each other over sidelinks to enable UE cooperation, as described in further detail at least below.

Figure 2:
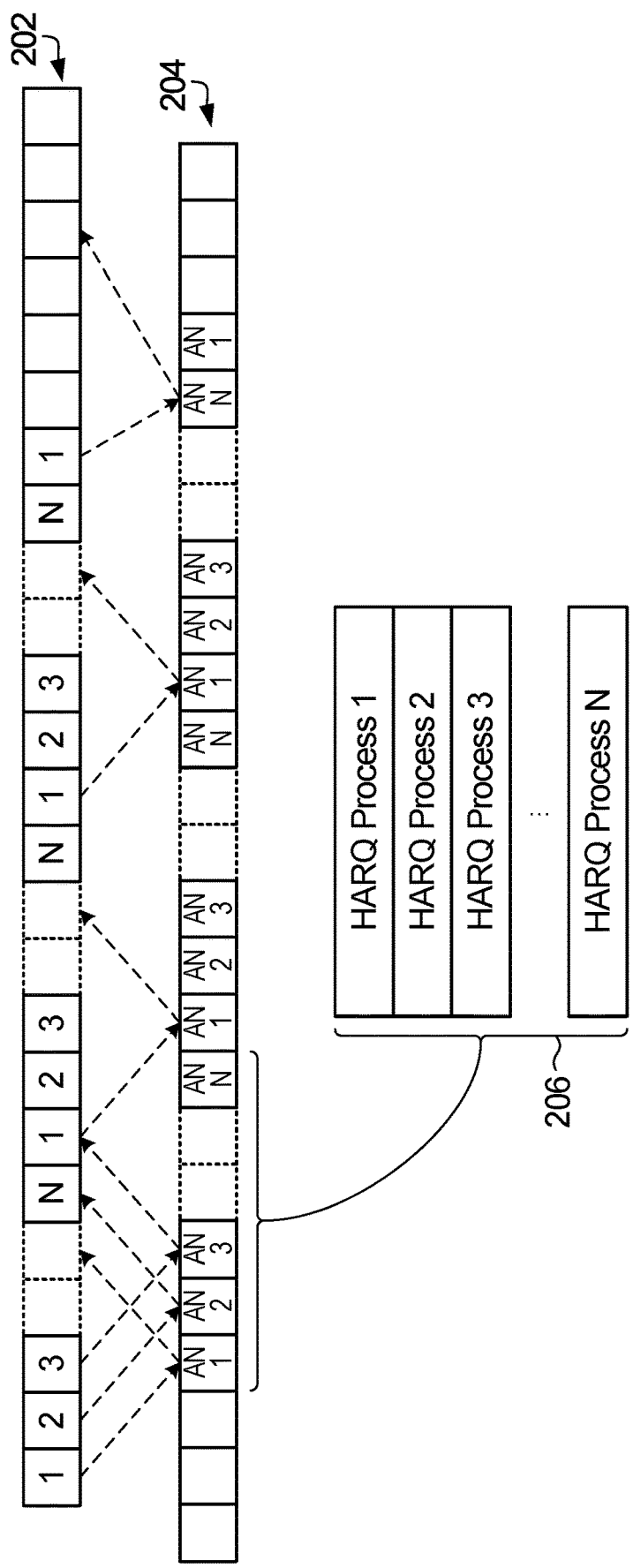
FIG. 2 is a block diagram illustrating a traditional HARQ retransmission mechanism.

Turning again to data block retransmission, FIG. 2 is a block diagram illustrating a traditional HARQ retransmission mechanism 200, in which network equipment sends a TB to a UE every N slots until the UE sends an ACK. In FIG. 2, at 202 each block represents a time slot in which a TB is sent by the network equipment, and at 204 each block represents a time slot in which the UE either correctly receives and decodes a TB and sends an ACK to the network equipment, or does not correctly receive and decode a TB and sends a NACK to the network equipment. The "AN" labels at 204 refer to ACK/NACK.

In this example of an N-slot retransmission schedule, the network equipment and the UE each instantiate or otherwise implement a HARQ entity 206 that supports N HARQ processes, to manage N TBs at a time. HARQ Process identifiers or identities, also referred to herein as HARQ IDs, are provided to the UE in Downlink Control Information (DCI) format, and each HARQ Process ID refers to a HARQ Process in a HARQ entity.

Suppose that a TB is not correctly received and decoded by the UE in slot 1 of the first three N-slot time frames, and the third retransmission is correctly received in the next frame. Each retransmission of the TB uses a different Redundancy Version (RV), such as a different FEC parameter. In this example, HARQ Process ID 1 is in effect locked out for 4*N time slots just to handle a single TB. This can result in inefficient usage of resources to deliver TBs to UEs.

UE cooperation-based HARQ retransmission as disclosed herein may be useful in making more efficient usage of resources, and involves cooperative UEs (CUEs) and target UEs (TUEs). The present disclosure provides mechanisms that define UE behaviors for CUEs and TUEs. UE behaviors for CUEs include helper modes and mechanisms in some embodiments, for CUEs to determine which transmissions to relay towards TUEs. UE behaviors for TUEs in some embodiments define mechanisms for identifying or determining transmissions that carry data blocks and that can be combined together, and mechanisms for generating HARQ-ACK feedback for such combined data blocks.

In-coverage and out-of-coverage scenarios are contemplated. For example, the CUE(s) and the TUE(s) may all be in-coverage. One or more CUEs, and/or one or more TUEs, may instead be out-of-coverage.

With UE cooperation-based data block retransmission, TUEs perform data block reception from multiple respective transmitters, and may combine data blocks received from those transmitters. If an in-coverage TUE is not able to correctly decode a data block that is received over a Uu link, then it may be able to correctly decode the data block based on the received Uu link data block and the same data block received from a CUE over a sidelink, for example.

In some embodiments, a TUE monitors for downlink assignments (also known as downlink control information) that schedule downlink data transmissions on a base station to UE link, and also monitors for sidelink downlink assignments (also known as sidelink control information) that schedule sidelink downlink data transmissions on a sidelink. In the present disclosure "sidelink downlink" refers to sidelink transmissions toward a target UE. For the purpose of downlink data reception feedback, a TUE may send uplink control information to the serving cell corresponding to data blocks transmitted on the downlink data transmission and the sidelink downlink data transmission.

For ease of use, terminology herein may refer to the following channels: for downlink assignment, PDCCH; for sidelink downlink assignment, PSCCH; for downlink data transmission, PDSCH; and for sidelink downlink data transmission, PSSCH. These are examples only, and other embodiments are possible.

One constraint that may impact UE cooperation-based retransmission is limited resources on CUEs. For example, there may be fewer CUEs than TUEs; there may be no mechanism for a CUE to determine which PDCCH transmissions relate to data blocks that are intended for a TUE and are to be sent over a sidelink; or there may be no mechanism to determine and allocate CUE resources (such as HARQ processes, transmission power, bands, spatial beam, antenna port, antenna panel, etc.) to UE cooperation.

Figure 3:
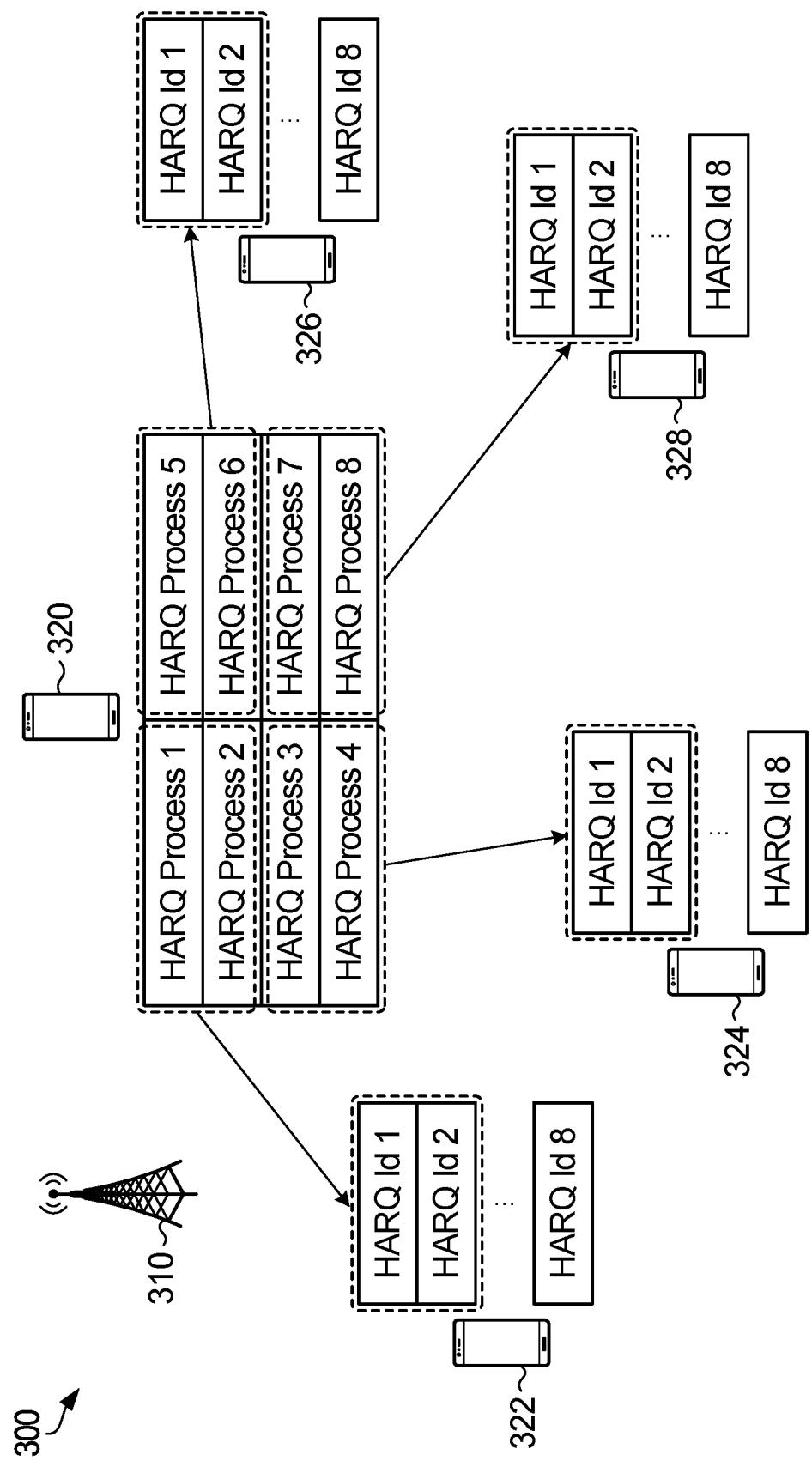
FIG. 3 is a block diagram of another example communication system and illustrates a UE cooperation group.

Consider FIG. 3, which is a block diagram of another example communication system 300 and illustrates a UE cooperation group. The example communication system 300 includes network equipment 310 and UEs 320, 322, 324, 326, 328 forming a UE cooperation group. The UE 320 is an in-coverage CUE with a Uu link (not shown) to the network equipment 310, and is configured to assist four TUEs 322, 324, 326, 328. FIG. 3 also shows an assignment or allocation of the eight HARQ processes at the CUE 320 among the four TUEs 322, 324, 326, 328. The CUE HARQ processes are distributed evenly in the example shown, and two HARQ processes are assigned to each TUE 322, 324, 326, 328.

Assignment or allocation of HARQ processes may involve transmitting, by the CUE 320 to each TUE 322, 324, 326, 328, signaling indicative of the HARQ ID for each HARQ process that is assigned to that CUE 320. In some embodiments, the HARQ IDs that are signaled or otherwise provided to the TUEs 322, 324, 326, 328 are associated with a HARQ mechanism that is actually being managed by the network equipment 310, and the HARQ IDs enable each TUE to identify transmissions as being related to the same data block. A TUE 322, 324, 326, 328 may receive transmissions related to the same data block from one or more CUEs 320 and the network equipment 310 if the TUE is in-coverage, or from multiple CUEs if the TUE is out-of-coverage.

HARQ processes are an example of a limited CUE resource, and this type of HARQ ID signaling is one example of an approach for sharing or distributing a CUE resource between multiple TUEs for UE cooperation-based retransmission. Other resource examples and allocation or assignment examples are also provided herein and may be used in other embodiments.

One form of UE cooperation that may be used to improve wireless communication network coverage, such as at cell edge or indoors, involves relaying data of a remote UE through a relay UE. For example, if a TUE is out-of-coverage or is in-coverage but in a coverage hole, then it could be helped by a relay UE, which may be considered a form of CUE that is configured to relay data between network equipment and a TUE. This type of relay link application in which remote TUEs are assisted by one or more relay UEs may be useful for data block retransmissions according to the present disclosure. Although reference is made to "relay UEs" herein, relay UEs may also be referred to as CUEs both here and elsewhere. Relay links refer to links that involve at least one intermediate component, including at least one relay UE. A relay link enables communications between a communication network or network equipment and a remote UE, which may or may not be within network coverage. A remote UE may also be referred to here and elsewhere as a TUE.

Figure 4:
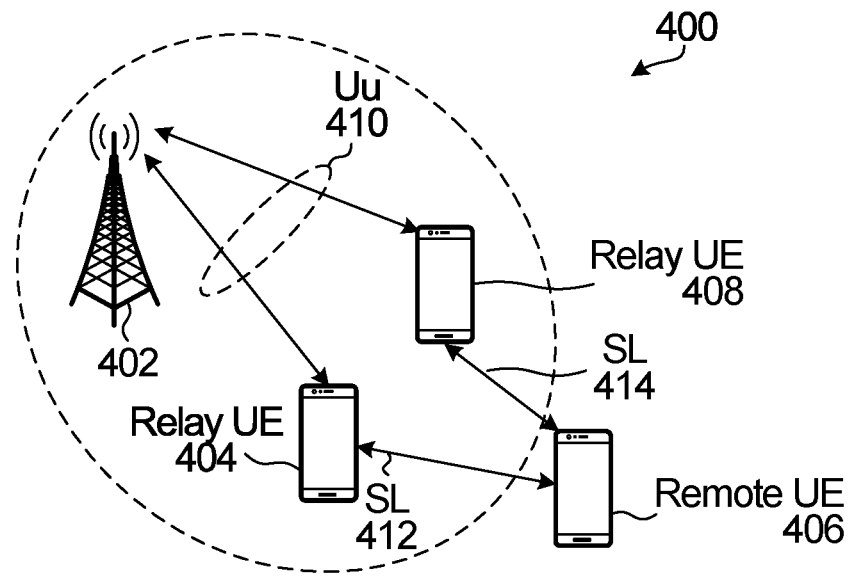
FIG. 4 is a block diagram of an example communication system with multiple relay links.

FIG. 4 is a block diagram of an example communication system with multiple relay links. The example system 400 includes network equipment 402 and UEs including relay UEs 404, 408 and a remote UE 406. Communications between the UEs 404, 408 and the network equipment 402 are through an interface shown as "Uu" 410 in FIG. 4, and sidelink communications directly between the UEs 404, 406, 408 are through sidelinks 412, 414. Examples of these components and implementation options for communications between these components are provided elsewhere herein. Network equipment 402 may be a network device or equipment such as a base station 170a, 170b in FIG. 1. The UEs 404, 406, 408 may be EDs 110a-c in FIG. 1, for example.

FIG. 4 represents one scenario in which UE cooperation may be useful. In this scenario, the remote UE 406 is out-of-coverage (outside of a geographical area of direct communication with the network equipment 402), and the relay UEs 404, 408 are within the coverage area of the network equipment. There are two relay links, each including a Uu segment at 410 between the network equipment 402 and a relay UE 404, 408, and a sidelink segment at 412, 414 between each relay UE 404, 408 and the remote UE 406.

Figure 5:
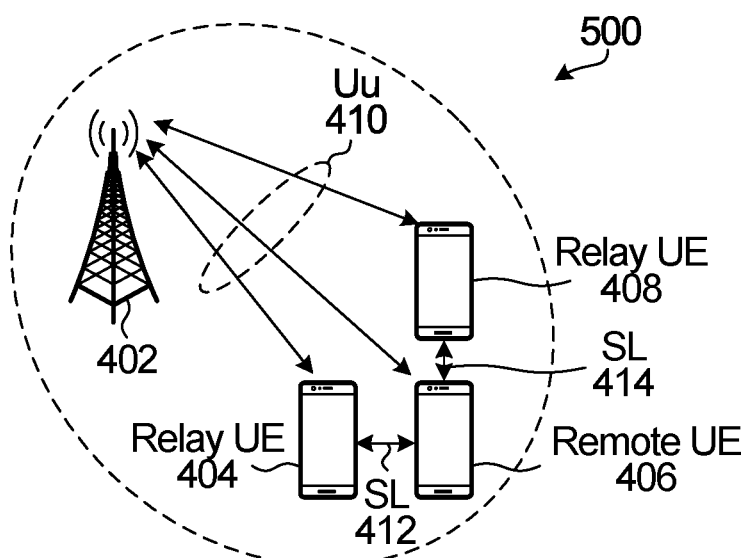
FIG. 5 is a block diagram of another example communication system, illustrating another multiple relay link scenario.

FIG. 5 is a block diagram of another example communication system, illustrating another multiple relay link scenario. In the example system 500, the difference from the example 400 is that the remote UE 406 is in-coverage in FIG. 5. However, there are still two relay links in the example system 500, each including a Uu segment at 410 between the network equipment 402 and a relay UE 404, 408, and a sidelink segment at 412, 414 between each relay UE 404, 408 and the remote UE 406.

Regardless of whether the remote UE 406 is out-of-coverage as in FIG. 4 or in-coverage as in FIG. 5, downlink transmission may involve the network equipment 402, illustratively a gNB, transmitting data to the multiple relay UEs 404, 408 on a Uu link 410, and the relay UEs relaying the data from the network equipment to the remote UE 406 on the sidelinks 412, 414. In a data block retransmission application, the network equipment 402 can transmit the same data block to the relay UEs 404, 408, using different RVs for example. Each relay UE 404, 408 could then relay the data block transmissions to the remote UE 406, and the remote UE can then attempt to decode the data block. The remote UE 406 may combine different received versions of the same data block if neither of the data block transmissions is correctly decoded on its own, for example.

As shown in FIG. 5, the remote UE 406 may also be in communication with the network equipment 402 via a Uu link 410. It should therefore be appreciated that UE cooperation-based data block retransmission may involve data block transmissions that are received by a remote UE over multiple relay links, or data block transmissions that are received by a remote UE over a Uu link and one or more relay links.

Figure 6:
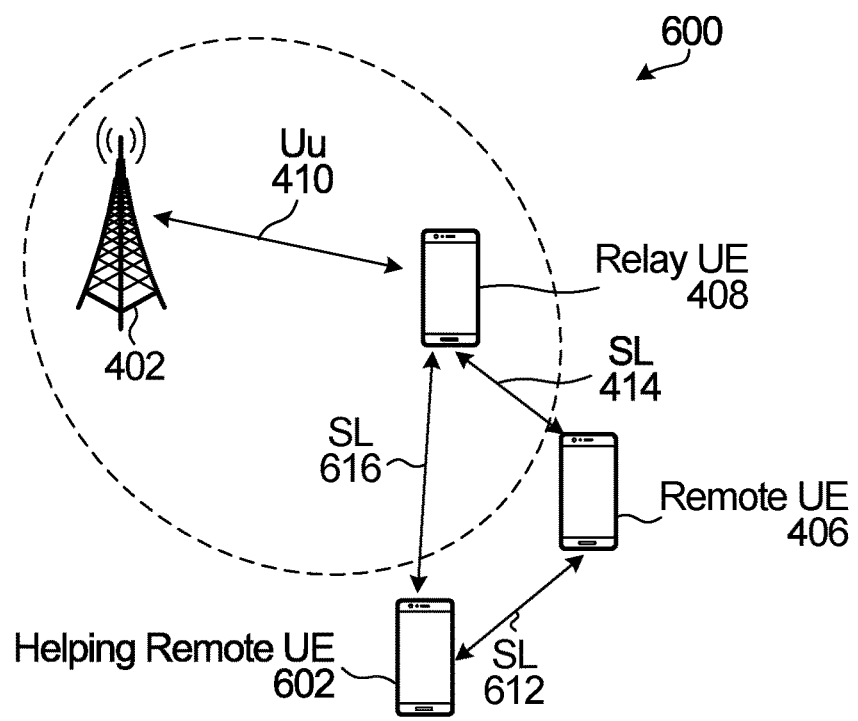
FIG. 6 is a block diagram of a further example communication system that includes a "helping" remote UE.

FIG. 6 is a block diagram of a further example communication system 600 that includes a "helping" remote UE 602 and illustrates an additional multiple relay link scenario. A helping remote UE is another example of a CUE, and may be based on another remote UE or another relay UE. Therefore, a remote UE that assists another remote UE may be referred to as a "helping" remote UE, a helping relay UE, a secondary relay UE, or some other variation.

The example system 600 includes multiple out-of-coverage remote UEs 406, 602, and an in-coverage relay UE 408. Two relay links are provided for the remote UE 406 in this example, including one relay link over the sidelink 414 and another relay link over the sidelinks 612, 616 through the "helping" remote UE 602. For downlink transmission, in an embodiment the network equipment 402, illustratively a gNB, transmits different versions of a data block, using different RVs for example, to the in-coverage relay UE 408 on the Uu link 410, and the relay UE then transmits one of the different versions of the data block to each of the out-of-coverage remote UEs 406, 602 on the sidelinks 414, 616. Each of the out-of-coverage remote UEs 406, 602 receives a different version of the data block from the relay UE 408, and the out-of-coverage helping remote UE 602 relays the version of the data block that it receives to the out-of-coverage destination remote UE 406 on the sidelink 612. In another embodiment, the network equipment 402 transmits the data block to the relay UE 408, and the relay UE 408 generates the different versions of the data block for transmission to the remote UEs 406, 602.

The remote UE 406 may attempt to decode either or each of the different received versions of the data block, or both received versions may be combined by the remote UE if neither of the data block transmissions is correctly decoded.

Figure 7:
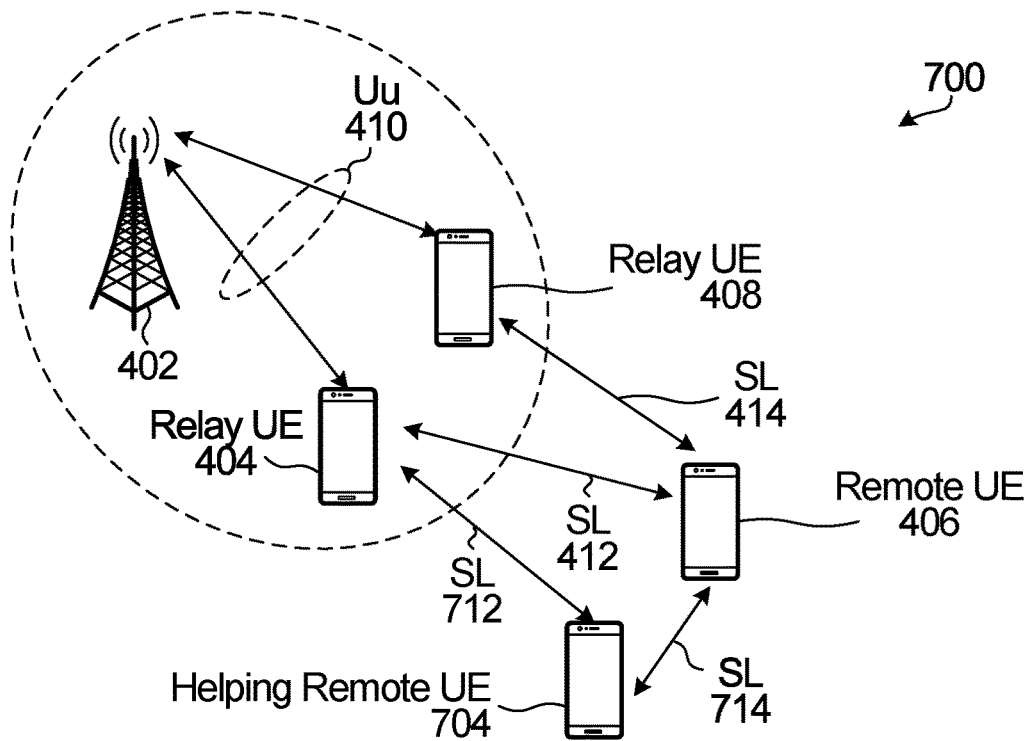
FIG. 7 is a block diagram of another example communication system, which is similar to FIG. 4 but with addition of a helping remote UE.

FIG. 7 is a block diagram of another example communication system 700, which is similar to FIG. 4 but with addition of a helping remote UE 704. The example system 700 also includes additional sidelinks 712, 714. In an embodiment the network equipment 402 transmits three different versions of a data block, using different RVs for example, to the relay UEs 408, 404 on the Uu link 410, including one version to the relay UE 408 and two versions to the relay UE 404. The relay UE 408 transmits its version of the data block received from the network equipment 402 to the remote UE 406 over the sidelink 414, and the relay UE 404 transmits one of its two different versions of the data block to each of the out-of-coverage remote UEs 406, 704 on the sidelinks 412, 712, respectively. Each of the out-of-coverage remote UEs 406, 704 receives a different version of the data block from the relay UE 404. The out-of-coverage helping remote UE 704 relays the version of the data block that it receives to the out-of-coverage destination remote UE 406 on the sidelink 714. In another embodiment, the network equipment 402 transmits the data block to the relay UE 404, and the relay UE 404 generates the different versions of the data block for transmission to the remote UEs 406, 704.

The remote UE 406 receives three versions of the data block in the example system 700, and may attempt to decode one or more of the different received versions of the data block. Multiple received versions may be combined by the remote UE 406 if none of the received data block transmissions is correctly decoded.

FIGS. 4 to 7 are intended to illustrate some of the many options for UE cooperation. Others are also possible. For example, other embodiments may involve one or more relay UEs and one or more in-coverage or out-of-coverage remote UEs. The teachings herein may be applied to scenarios in which communications are between UEs, and do not involve network equipment such as 402 as a source of data blocks. The present disclosure, and UE cooperation-based data block retransmission, are not limited only to these examples, or to any particular examples that are used to describe embodiments in further detail below.

Figure 8:
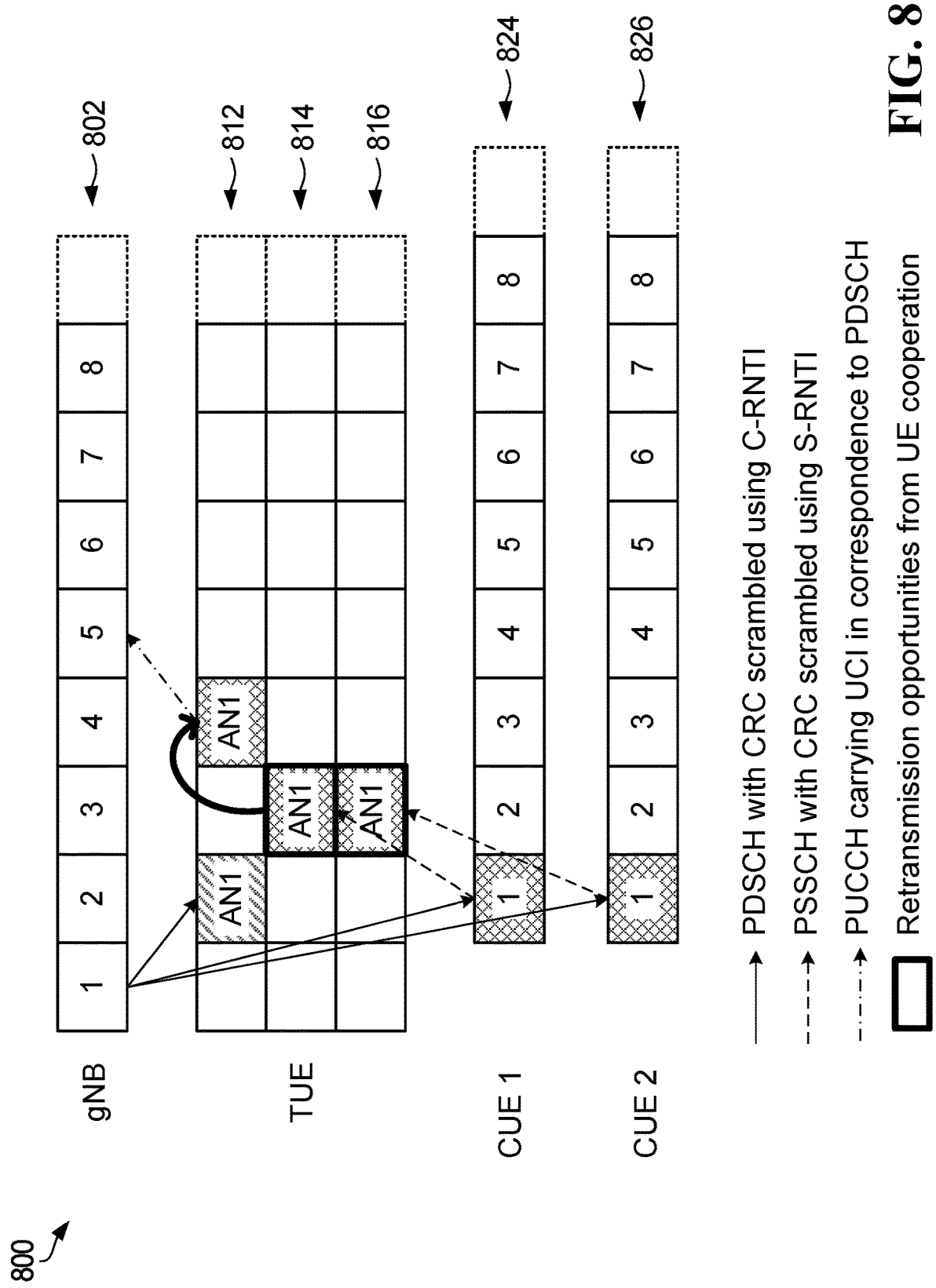
FIG. 8 is a block diagram illustrating data block retransmission according to an embodiment.

FIG. 8 is a block diagram illustrating data block retransmission according to an embodiment. In FIG. 8, at 802 each block represents a time slot in which a data block such as a TB is sent by network equipment, which is shown by way of example as a gNB. At 812, each block represents a time slot in which a TUE may receive a TB from the gNB. Similarly, each block at 814, 816 represents a time slot in which the TUE may receive a retransmitted TB from a CUE 1 and a CUE 2, respectively. Finally, each block at 824, 826 represents a time slot in which CUE 1 and CUE 2 may receive a TB from the gNB and transmit the TB to the TUE. As in FIG. 2, the "AN" labels refer to ACK/NACK. In the example 800, only the TUE transmits an ACK/NACK to the gNB depending upon whether a TB is correctly decoded.

The gNB transmits the same TB, or different versions of the same TB such as different versions using different RVs, to the TUE, to CUE 1, and to CUE 2 in slot 1. In this example, the TUE does not correctly decode the TB received from the gNB. Instead of sending a NACK on detecting decoding failure, the TUE awaits retransmissions of the TB from CUE 1 and CUE 2, which detect that the transmissions received from the gNB are meant for the TUE. Each CUE in the example shown correctly receives the TB and retransmits the TB to the TUE.

A CUE may decode or otherwise process a received transmission, or relay a received transmission without necessarily performing decoding or other processing. For example, in some embodiments a received transmission need not be decoded to determine that the transmission is to be transmitted to another CUE and/or to a TUE. In other embodiments, at least some processing is performed by a CUE to determine the destination of a received transmission or TB, to determine whether the transmission or TB can be decoded, and/or to generate a different version of a transmission or TB using a different RV for example.

In the example shown, the TUE receives and correctly decodes the TB from the CUE retransmissions at the retransmission opportunities shown at 814, 816, in a next time slot in this example, and then transmits an ACK to the gNB. Otherwise, the TUE transmits a NACK to the gNB in this ACK/NACK example.

Embodiments to support this type of UE cooperation-based retransmission may involve such mechanisms as any one or more of: a UE mechanism for a TUE to determine whether a TB in PDSCH and TB in PSSCH are the same or related, a UE mechanism for a TUE to report ACK/NACK feedback under UE cooperation, and a UE mechanism for a TUE to generate Uplink Control Information (UCI) jointly from multiple received transmissions, such as a Uu link transmission from the gNB and one or more sidelink transmissions from CUE 1 and/or CUE 2 in the example 800.

Figure 9:
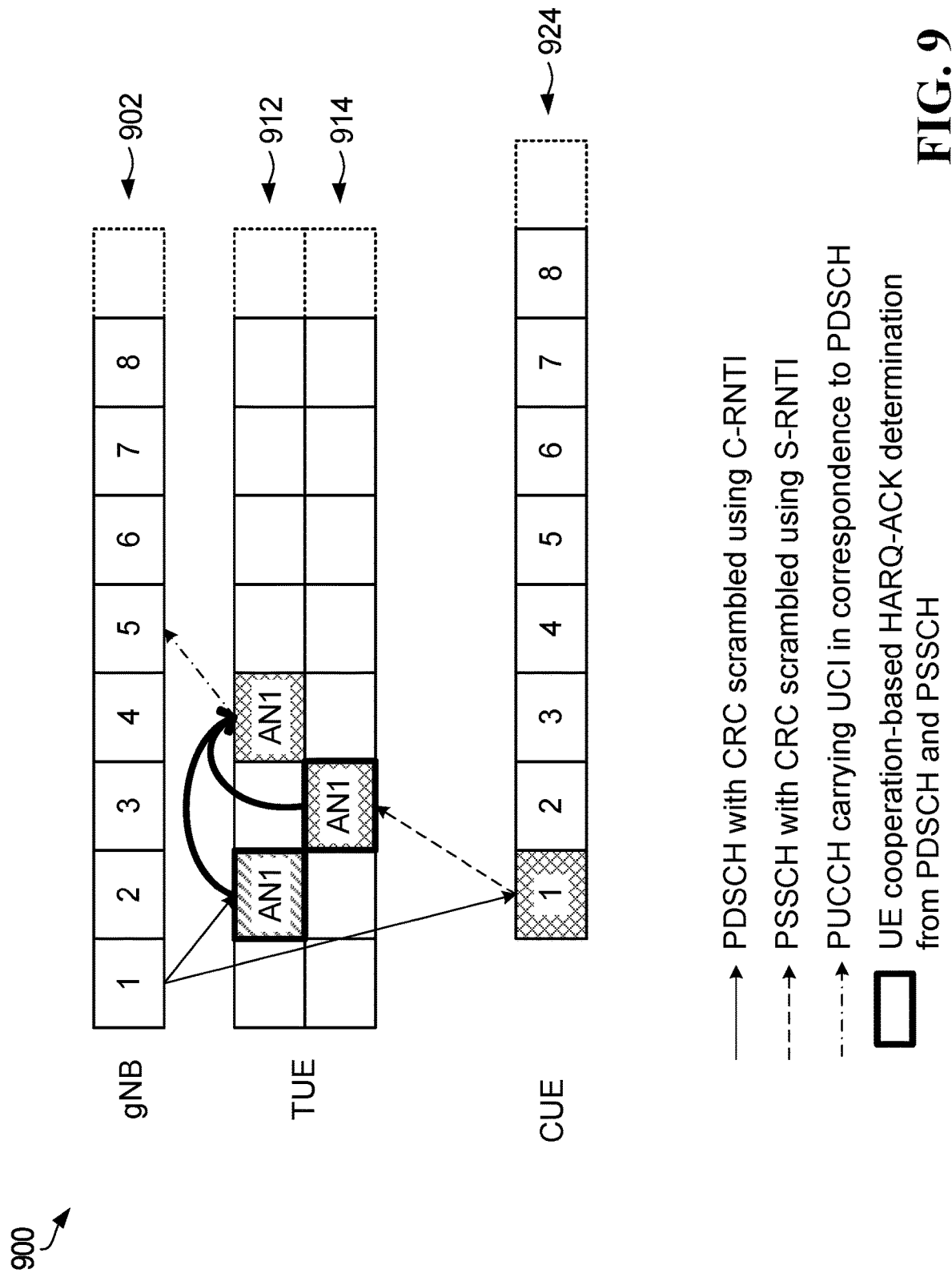
FIG. 9 is a block diagram illustrating data block retransmission according to another embodiment.

FIG. 9 is a block diagram illustrating data block retransmission according to another embodiment. In FIG. 9, at 902 each block represents a time slot in which a TB is sent by network equipment, which is shown by way of example as a gNB as in FIG. 8. At 912, each block represents a time slot in which a TUE may receive a TB from the gNB, each block at 914 represents a time slot in which the TUE may receive a retransmitted TB from a CUE, and each block at 924 represents a time slot in which the CUE may receive a TB from the gNB and transmit the TB to the TUE. The "AN" labels, as in other drawings, refer to ACK/NACK. In the example 900, only the TUE transmits an ACK/NACK to the gNB depending upon whether a TB is correctly decoded. The delay or span between the transmission of the TB by the gNB in PDSCH and reception of the HARQ feedback by the gNB in PUCCH is 4 slots in the example shown.

The gNB transmits the same TB, or different versions of the same TB such as different versions using different RVs, to the TUE and to the CUE, and in this example the TUE does not correctly decode the TB. The CUE is able to decode TB in PDSCH in this example, and determines that the transmission received from the gNB is meant for the TUE. The CUE then transmits the TB from PDSCH in PSSCH to the TUE, and the TUE is able to decode the TB in PSSCH in this example.

In FIG. 9, the TUE does not send a NACK to the gNB when decoding fails at 912, but instead waits to receive a retransmission from the CUE at 914 and then sends an ACK in PUCCH back to the gNB responsive to successful decoding of the retransmission from the CUE.

Figure 10:
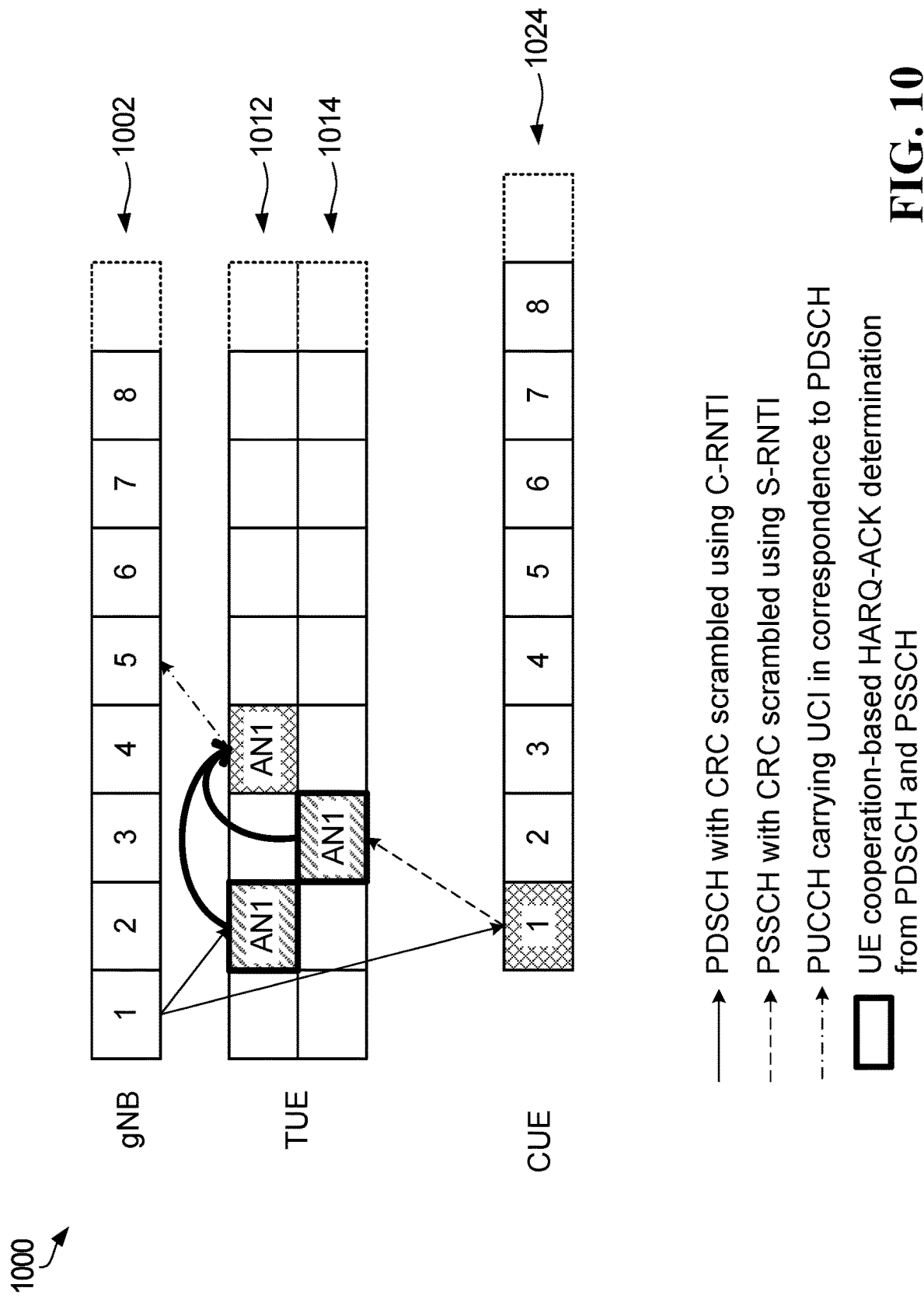
FIG. 10 is a block diagram illustrating data block retransmission according to a further embodiment.

FIG. 10 is a block diagram illustrating data block retransmission according to a further embodiment. In FIG. 10, each block at 1002, 1012, 1014, 1024 represents a time slot in which a TB may be sent and/or received and the "AN" labels refer to ACK/NACK, as described with reference to FIG. 9, for example. In the example 1000, only the TUE transmits an ACK/NACK to the gNB depending upon whether a TB is correctly decoded, and the delay or span between the transmission of the TB by the gNB in PDSCH and reception of the HARQ feedback by the gNB in PUCCH is 4 slots.

As in FIG. 9, in the example 1000 the gNB transmits the same TB, or different versions of the same TB such as different versions using different RVs, to the TUE and to the CUE, the TUE does not correctly decode the TB, and the CUE correctly decodes the TB in PDSCH and transmits PSSCH to the TUE, carrying the TB from PDSCH. As shown by the different cross-hatching pattern at 1014, in the example 1000 the TUE is not able to decode the TB in PSSCH.

The example 1000 illustrates recovery of a TB using soft combining of erroneous TBs. Multiple transmissions of the same TB or multiple versions of a TB, from PDSCH and PSSCH in this example, may be decodable in combination, even though no single transmission or version is decodable. On successful combined decoding, the TUE sends an ACK in PUCCH back to the gNB.

In UE cooperation-based data block retransmission, a UE receives TBs from multiple transmitters, over PDSCH and PSSCH in the examples shown in FIGS. 8 to 10. Current HARQ mechanisms, however, do not provide a way for a UE to determine which PDSCH/PSSCH transmissions carry the same TB or related TBs such as the same TB using different RVs.

In an embodiment, a TUE may identify related data block transmissions based on HARQ process ID, and then determine TB status from successful individual data block decoding of any one of the related data block transmissions or successful combined data block decoding of more than one of the related data block transmissions. For UE cooperation-based data block retransmission, the TUE is configured with at least two physical links. As an example, consider a scenario in which the TUE is configured with a Uu link to network equipment and a sidelink to a CUE, and the CUE uses the same HARQ ID as used in the Uu link for forwarding the TB on to the TUE on the sidelink.

The TUE monitors for PDCCHs scheduling PDSCH on the Uu link and also monitors for PSCCHs scheduling PSSCH on the sidelink. If a PDCCH and a PSCCH carry Downlink Control Information (DCI) and Sidelink Control Information (SCI) indicating the same HARQ ID, then the TUE assumes that the corresponding PDSCH and PSSCH carry related TBs. Stated another way, the TUE assumes that the received PDSCH p in slot n with HARQ ID=k in HARQ Entity HE1 on Uu carries the same TB or another version of the TB with a different RV for example, as the received PSSCH p' in slot n+i (i>0, and i=1 in FIGS. 9 and 10) with HARQ ID=kin HARQ Entity HE2 on sidelink.

The TBs received in PDSCH and PSSCH are stored at the TUE, such as in the same HARQ buffer indexed by the HARQ ID carried in the DCI and the SCI in this example. The coded bits of the received TBs may correspond to the same or different versions, such as different redundancy versions, of the same TB. The TUE generates HARQ-ACK information for the TBs corresponding to the same HARQ ID.

HARQ-ACK information can be generated in any of various ways. For example, the TUE may generate and report HARQ-ACK feedback on PUCCH to the Uu link based on TB status received in a process with HARQ ID=k of HARQ Entity {HE1, HE2}, e.g. HARQ-ACK=HARQ-$ACK_p$ OR HARQ-$ACK_{p'}$, or equivalently HARQ-ACK=HARQ-$ACK_{PDSCH}$ OR HARQ-$ACK_{PSSCH}$. Another possible option for ACK/NACK reporting involves the TUE generating and reporting combined HARQ-ACK feedback for TBs received in a process with HARQ ID=k of HARQ Entity {HE1, HE2}, e.g. HARQ-ACK={HARQ-$ACK_p$, HARQ-$ACK_{p'}$}, or equivalently HARQ-ACK={HARQ-$ACK_{PDSCH}$, HARQ-$ACK_{PSSCH}$}. Different values of HARQ-ACK may be tabulated, in a codebook for example.

HARQ-ACK codebooks indicate values that a UE reports back to the network equipment for TBs that are received in a HARQ process. An example codebook is given below for an example in which a UE is configured to receive one PDSCH p and one PSSCH p'. Similar codebooks can be designed for other use cases, such as those involving multiple PSSCHs.

|  | PDSCH-ACK | PDSCH-NAK | PDSCH-Error |
| --- | --- | --- | --- |
| PSSCH-ACK | 111 | 101 | N/A |
| PSSCH-NAK | 011 | 010 | N/A |
| PSSCH-Error | 001 | 000 | N/A |

In the following paragraphs, different UE behaviors under different conditions, according to an embodiment, are described. If the following conditions are met:
    UE detects PDCCH scheduling PDSCH p
    UE detects PSCCH scheduling PSSCH p'
    UE correctly decodes TB in PDSCH p
    UE correctly decodes TB in PSSCH p', then the UE sends HARQ-ACK feedback, to a base-station on a Uu link for example, with the HARQ-ACK feedback field set to '111' in this example.
Similarly, if the following conditions are met:
    UE detects PDCCH scheduling PDSCH p
    UE detects PSCCH scheduling PSSCH p'
    UE does not correctly decode TB in PDSCH p
    UE correctly decodes TB in PSSCH p',
then in this example the UE sends HARQ-ACK feedback that is set to '101' based on the corresponding codebook entry.
Similarly, if the following conditions are met:
    UE does not detect PDCCH scheduling PDSCH p
    UE detects PSCCH scheduling PSSCH p'
    UE does not correctly decode TB in PDSCH p
    UE correctly decodes TB in PSSCH p',
then in this example the UE does not send HARQ-ACK feedback.
Similarly, if the following conditions are met:
    UE detects PDCCH scheduling PDSCH p
    UE detects PSCCH scheduling PSSCH p'
    UE correctly decodes TB in PDSCH p
    UE does not correctly decode TB in PSSCH p',
then in this example the UE sends HARQ-ACK feedback with the HARQ-ACK feedback field set to '011'.
Similarly, if the following conditions are met:
    UE detects PDCCH scheduling PDSCH p
    UE detects PSCCH scheduling PSSCH p'
    UE does not correctly decode TB in PDSCH p
    UE does not correctly decode TB in PSSCH p',
then in this example the UE sends HARQ-ACK feedback with the HARQ-ACK feedback field set to '010'.
Similarly, if the following conditions are met:
    UE does not detect PDCCH scheduling PDSCH p
    UE detects PSCCH scheduling PSSCH p'
    UE does not correctly decode TB in PDSCH p
    UE correctly decodes TB in PSSCH p', then in this example the UE does not send HARQ-ACK feedback.
Similarly, if the following conditions are met:
    UE detects PDCCH scheduling PDSCH p
    UE does not detect PSCCH scheduling PSSCH p'
    UE correctly decodes TB in PDSCH p
    UE does not correctly decode TB in PSSCH p', then in this example the UE sends HARQ-ACK feedback with the HARQ-ACK feedback field set to '001'.
Similarly, if the following conditions are met:
UE detects PDCCH scheduling PDSCH p
UE does not detect PSCCH scheduling PSSCH p'
UE does not correctly decode TB in PDSCH p
UE does not correctly decode TB in PSSCH p',
then in this example the UE sends HARQ-ACK feedback with the HARQ-ACK feedback field set to '000'.
Similarly, if the following conditions are met:
UE does not detect PDCCH scheduling PDSCH p
UE does not detect PSCCH scheduling PSSCH p'
UE does not correctly decode TB in PDSCH p
UE does not correctly decode TB in PSSCH p',
then in this example the UE does not send HARQ-ACK feedback.

These are illustrative examples of how HARQ-ACK may be generated in some embodiments. Other embodiments are possible, and the present disclosure is not limited to any particular form of HARQ-ACK feedback or any specific way of generating such feedback.

Potential benefits of HARQ ID-based embodiments may include faster retransmission rate relative to traditional HARQ mechanisms, because TUEs no longer have to wait for scheduled retransmissions that may enable correct decoding of data blocks. Another potential benefit relative to traditional HARQ mechanisms is increased robustness, in that TUEs maintain multiple physical links active in order to receive data blocks. Tracking related transmissions using HARQ ID may provide a further benefit of a unified protocol stack, according to which a TUE maintains only one HARQ entity and different physical links refer to HARQ processes from the same TUE HARQ entity. Combined uplink feedback is another potential benefit. For example, an in-coverage TUE may maintain only one PUCCH on the Uu link to transmit HARQ-ACK feedback corresponding to data blocks that are transmitted to the TUE and received by the TUE on both the PDSCH and one or more PSSCHs.

FIG. 11 is a block diagram illustrating data block retransmission according to yet another embodiment. In the example 1100 in FIG. 11, each block at 1102, 1112, 1114, 1124 represents a time slot in which a TB may be sent and/or received, and the "AN" labels refer to ACK/NACK. FIG. 11 relates to an embodiment in which a TUE may identify related data block transmissions based on slots. A slot-based embodiment is described below by way of example in the context of a TUE that is configured with at least two physical links, including a Uu link and a sidelink.

The TUE monitors for PDCCHs scheduling PDSCH on the Uu link and also monitors for PSCCHs scheduling PSSCH on the sidelink. If a PDCCH schedules a PDSCH transmission in slot n and a PSCCH schedules a PSSCH transmission in slot n+A, where A is the delay or gap between the PDSCH and the PSSCH in number of slots, then the TUE assumes that the corresponding PDSCH and PSSCH carry related TBs. In this scenario, the CUE uses PSSCH in slot n with an offset A relative to that used on Uu for forwarding the TB to the TUE. The TUE assumes that the received PDSCH p in slot n on Uu carries the same TB or another version of the TB using a different RV for example, as the received PSSCH p' in slot n+A (A>0, and A=6 in FIG. 11) on sidelink. The offset A could be statically, semi-statically, or dynamically configured in the CUE and the TUE, for example.

The TBs received in PDSCH and PSSCH are stored at the TUE, in the HARQ buffer indexed by a HARQ ID in DCI for example. The coded bits of the received TBs may correspond to the same or different versions, such as different redundancy versions, of the same TB. The TUE generates HARQ-ACK information for the TBs corresponding to the HARQ ID. The HARQ-ACK information can be generated in any of various ways, including but in no way limited to the following examples, similar to those described at least above for HARQ ID-based embodiments: based on TB status received in {slot n, slot n+Δ}, e.g., HARQ-ACK=HARQ-ACK$_p$ OR HARQ-ACK$_{p'}$, or equivalently HARQ-ACK=HARQ-ACK$_{PDSCH}$ OR HARQ-ACK$_{PSSCH}$; or combined HARQ-ACK feedback for TBs received in {slot n, slot n+Δ}, e.g. HARQ-ACK={HARQ-ACK$_p$, HARQ-ACK$_{p'}$}, or equivalently HARQ-ACK={HARQ-ACK$_{PDSCH}$, HARQ-ACK$_{PSSCH}$} where different values of HARQ-ACK are tabulated, in a codebook for example.

In a slot-based embodiment, A is a time offset that is known at both the CUE(s) and the TUE. Consider an example with one CUE and one TUE. A is configured or otherwise provided to the TUE so that it is aware of the timing relation to determine which TBs to combine for the purpose of HARQ-ACK feedback reporting, and A is also configured or otherwise provided to the CUE so that the TUE can perform HARQ-ACK feedback reporting as per the UE cooperation mechanism.

Potential benefits of slot-based embodiments relative to traditional HARQ mechanisms may include at least those identified above for HARQ ID-based embodiments. Relative to HARQ ID-based embodiments, slot-based embodiments may have the advantage of allowing dynamically configurable time-relations for the purpose of data retransmission, because UEs are typically restricted to a small number of HARQ processes and slots may provide an additional degree of freedom for network equipment to use for data retransmission purposes.

The embodiments above represent a wireless system based on a time granularity using slots. Other examples of granularity include: OFDM symbol, group of OFDM symbols, mini-slot, and group of slots.

Figure 12A:
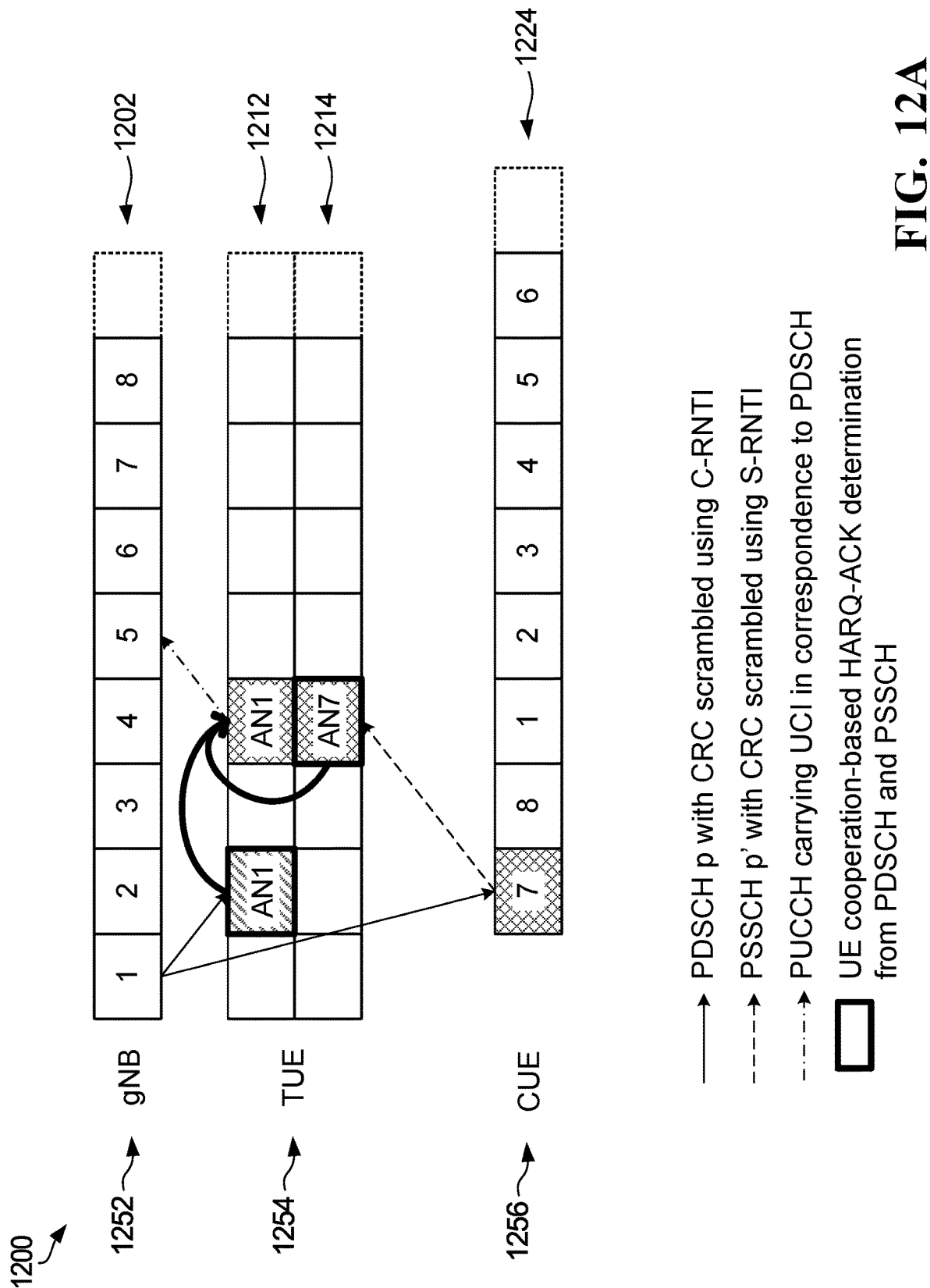
FIG. 12A is a block diagram illustrating data block retransmission according to a still further embodiment.
Figure 12B:
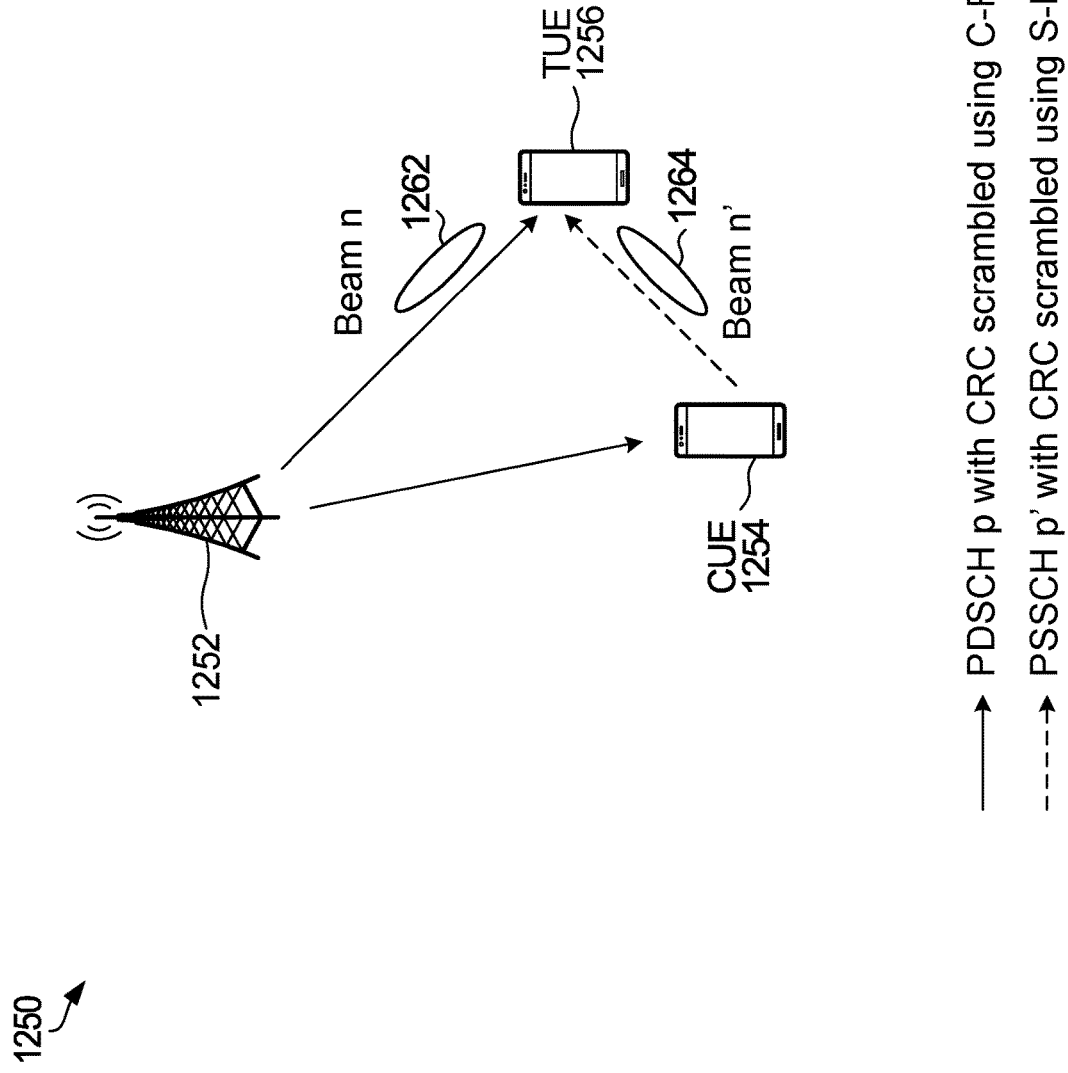
FIG. 12B is a block diagram illustrating a beam-based data block retransmission embodiment.

FIG. 12A is a block diagram illustrating data block retransmission according to a still further embodiment. In the example 1200, each block at 1202, 1212, 1214, 1224 represents a time slot in which a TB may be sent and/or received and the "AN" labels refer to ACK/NACK. FIG. 12A illustrates data block retransmission, and FIG. 12B is a related block diagram illustrating a beam-based data block retransmission embodiment in which a TUE may identify related data block transmissions based on antenna beams, or antenna ports. In FIG. 12B, the example communication system 1250 includes the gNB 1252, the CUE 1254, and the TUE 1256, which are also referenced in FIG. 12A.

A beam-based embodiment is described below in the context of the same example used elsewhere herein, in which a TUE that is configured with at least two physical links, including a Uu link and a sidelink.

The TUE 1256 monitors for PDCCHs scheduling PDSCH on the Uu link and also monitors for PSCCHs scheduling PSSCH on the sidelink. If a PDCCH schedules a PDSCH transmission using a beam n 1262 (FIG. 12B) and a PSCCH schedules a PSSCH transmission using beam n' 1264 (FIG. 12B), then the TUE 1256 assumes that the corresponding PDSCH and PSSCH carry related TBs. Beam n 1262 may be indicated by Transmission Configuration Indicator (TCI) state in DCI and beam n' 1264 may be indicated by TCI state in SCI, for example. In this scenario, the TUE 1256 assumes that the received PDSCH p in beam n 1262 on Uu carries the same TB or another version of the TB using a different RV for example, as the received PSSCH p' on beam n' 1264 on sidelink. The CUE 1254 may use the same or different antenna panels to receive from the gNB 1252 and transmit to the TUE 1256 on beam n' 1264. The TUE 1256 may use the same or different antenna panels to receive on beam n 1262 and beam n' 1264.

The TBs received in PDSCH and PSSCH are stored at the TUE 1256, in the HARQ buffer indexed by a HARQ ID in DCI in this example. The coded bits of the received TBs may correspond to the same or different versions, such as different redundancy versions, of the same TB. The TUE 1256 generates HARQ-ACK information for the TBs corresponding to the HARQ ID. The HARQ-ACK information can be generated in any of various ways, including but in no way limited to the following examples, similar to those described at least above for HARQ ID-based embodiments: based on TB status received in {PDSCH p on beam n 1262, PSSCH p' on beam n' 1264}, e.g., HARQ-ACK=HARQ-ACK$_p$ OR HARQ-ACK$_{p'}$, or equivalently HARQ-ACK=HARQ-ACK$_{PDSCH}$ OR HARQ-ACK$_{PSSCH}$; or combined HARQ-ACK feedback for TBs received in {PDSCH p on beam n, PSSCH p' on beam n'}, e.g. HARQ-ACK={HARQ-ACK$_p$, HARQ-ACK$_{p'}$}, or equivalently HARQ-ACK={HARQ-ACK$_{PDSCH}$, HARQ-ACK$_{PSSCH}$} where different values of HARQ-ACK are tabulated, in a codebook for example.

Potential benefits of beam-based embodiments relative to traditional HARQ mechanisms may include at least those identified above for HARQ ID-based embodiments. Potential benefits of beam-based embodiments relative to HARQ ID-based embodiments may be similar to those identified above for slot-based embodiments. Relative to slot-based embodiments, beam based embodiments may have the advantage of allowing dynamically configurable beam relations for the purpose of data retransmission, because UEs in high-frequency ranges, in which propagation conditions may be worse, may use analog beamforming in order to reach network equipment or other UEs. Beams may offer an additional degree of freedom for network equipment to use for data retransmission purposes.

According to another embodiment, a TUE may identify related data block transmissions based on Physical Resource Block (PRB) sets. An illustrative example is described below in the context of the same example used elsewhere herein, in which a TUE that is configured with at least two physical links, including a Uu link and a sidelink.

The TUE monitors for PDCCHs scheduling PDSCH on the Uu link and also monitors for PSCCHs scheduling PSSCH on the sidelink. If a PDCCH schedules a PDSCH transmission using a PRB set r and a PSCCH schedules a PSSCH transmission using a PRB set r', then the TUE assumes that the corresponding PDSCH and PSSCH carry related TBs. For example, the PDCCH may schedule the PDSCH transmission with the corresponding DCI carrying a frequency domain resource allocation field indicating PRBs within PRB set r, and the PSCCH may schedule a PSSCH transmission with the corresponding SCI carrying a frequency domain resource allocation field indicating PRBs within PRB set r'. In this scenario, the TUE assumes that the received PDSCH p in PRB set r on Uu carries the same TB or another version of the TB using a different RV for example, as the received PSSCH p' in PRB set r' on sidelink. PRB sets r and r' may have the same or different cardinality.

The TBs received in PDSCH and PSSCH are stored at the TUE, in the HARQ buffer indexed by a HARQ ID in DCI for example. The coded bits of the received TBs may correspond to the same or different versions, such as different redundancy versions, of the same TB. The TUE generates HARQ-ACK information for the TBs corresponding to the HARQ ID. The HARQ-ACK information can be generated in any of various ways, including but in no way limited to the following examples, similar to those described at least above for HARQ ID-based embodiments: based on TB status received in {PRB set r, PRB set r'}, e.g., HARQ-ACK=HARQ-ACK$_p$ OR HARQ-ACK$_{p'}$, or equivalently HARQ-ACK=HARQ-ACK$_{PDSCH}$ OR HARQ-ACK$_{PSSCH}$; or combined HARQ-ACK feedback for TBs received in {PRB set r, PRB set r'}, e.g. HARQ-ACK={HARQ-ACK$_p$, HARQ-ACK$_{p'}$}, or equivalently HARQ-ACK={HARQ-ACK$_{PDSCH}$, HARQ-ACK$_{PSSCH}$} where different values of HARQ-ACK are tabulated, in a codebook for example.

Potential benefits of PRB-based embodiments relative to traditional HARQ mechanisms may include at least those identified above for HARQ ID-based embodiments.

Figure 13:
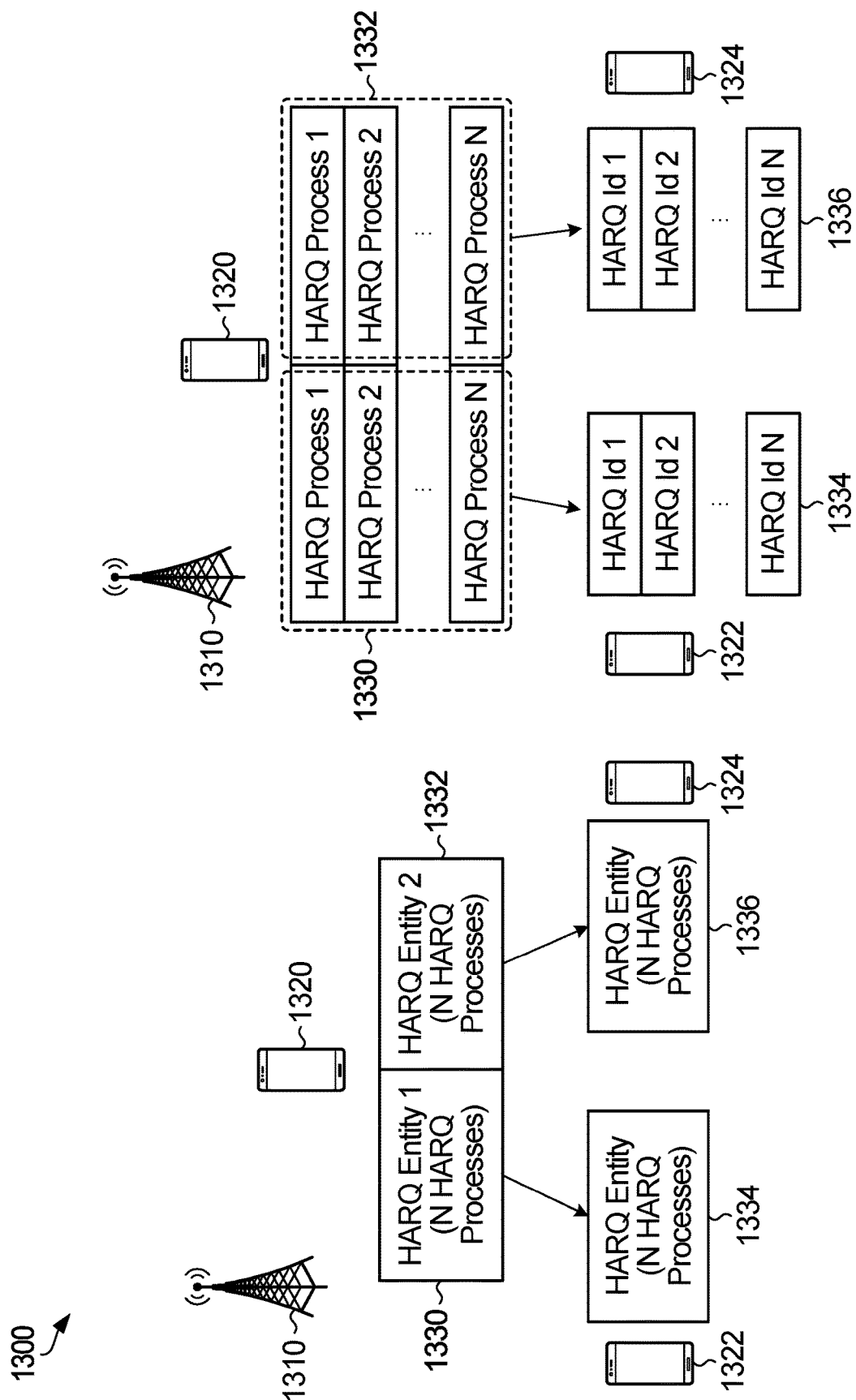
FIG. 13 is a block diagram of another example communication system and illustrates a UE cooperation group in which a CUE supports multiple HARQ entities.

As noted above, HARQ processes are an example of a limited CUE resource. FIG. 3 illustrates one approach for sharing or distributing this CUE resource between multiple TUEs. In another embodiment, CUEs are configured to support multiple HARQ entities. FIG. 13 is a block diagram of another example communication system and illustrates a UE cooperation group in which a CUE supports multiple HARQ entities. The example system 1300 includes network equipment 1310 and a UE cooperation group that includes a CUE 1320 and TUEs 1322, 1324. FIG. 13 includes two views of the example system 1300, including a view at the left illustrating HARQ entities 1330, 1332 at the CUE 1320 and a HARQ entity 1334, 1336 at each TUE 1322, 1324, respectively, and a view at the right illustrating N HARQ processes of each HARQ entity.

In the example system 1300, the CUE 1320 is configured with multiple HARQ entities 1330, 1332, and each HARQ entity at the CUE is mapped to a respective HARQ entity 1334, 1336 at a TUE 1322, 1324. The CUE 1320 is further configured with HARQ processes in each HARQ entity 1330, 1332, and each HARQ process at the CUE is mapped to a HARQ process at a TUE 1322, 1324.

In an embodiment, the CUE 1320 signals its multi-HARQ entity capability to the network equipment 1310, by signaling a two-HARQ entities capability for the example in FIG. 13, and the network equipment then configures the CUE to assist the two TUEs 1322, 1324, creating associations between each HARQ entity 1330, 1332 and a respective TUE.

HARQ entity mapping is a one-to-one mapping between HARQ entities of a CUE and a TUE in some embodiments. As shown by way of example in FIG. 13, CUE HARQ Entity 1 at 1330 is uniquely mapped to the HARQ Entity 1334 of the TUE 1322, and CUE HARQ Entity 2 at 1332 is uniquely mapped to the HARQ Entity 1336 of the TUE 1324.

HARQ process mapping may similarly be one-to-one and unique. CUE HARQ processes and TUE HARQ processes may use the same HARQ IDs, and this is one example of HARQ process mapping. In some embodiments, a one-to-one mapping between HARQ processes of HARQ entities does not rely on using the same HARQ IDs. For example, CUE HARQ ID p may map to TUE HARQ ID (p'+offset), where offset is configurable and unique to each TUE that is being assisted by a particular CUE.

Potential benefits of mapping CUE and TUE HARQ entities and HARQ processes may include providing a flexible protocol stack, in that CUEs can allocate different logical resources in the form of HARQ entities and physical resources in the form of HARQ processes to different TUEs on the fly. TUEs may benefit from a unified protocol stack, in that TUEs may maintain only one HARQ entity, allowing different physical links to refer to HARQ processes from the same HARQ entity. The embodiments shown in FIGS. 3 and 13 are similar in that they relate to efficiently allocating resources, albeit in different ways.

Figure 14:
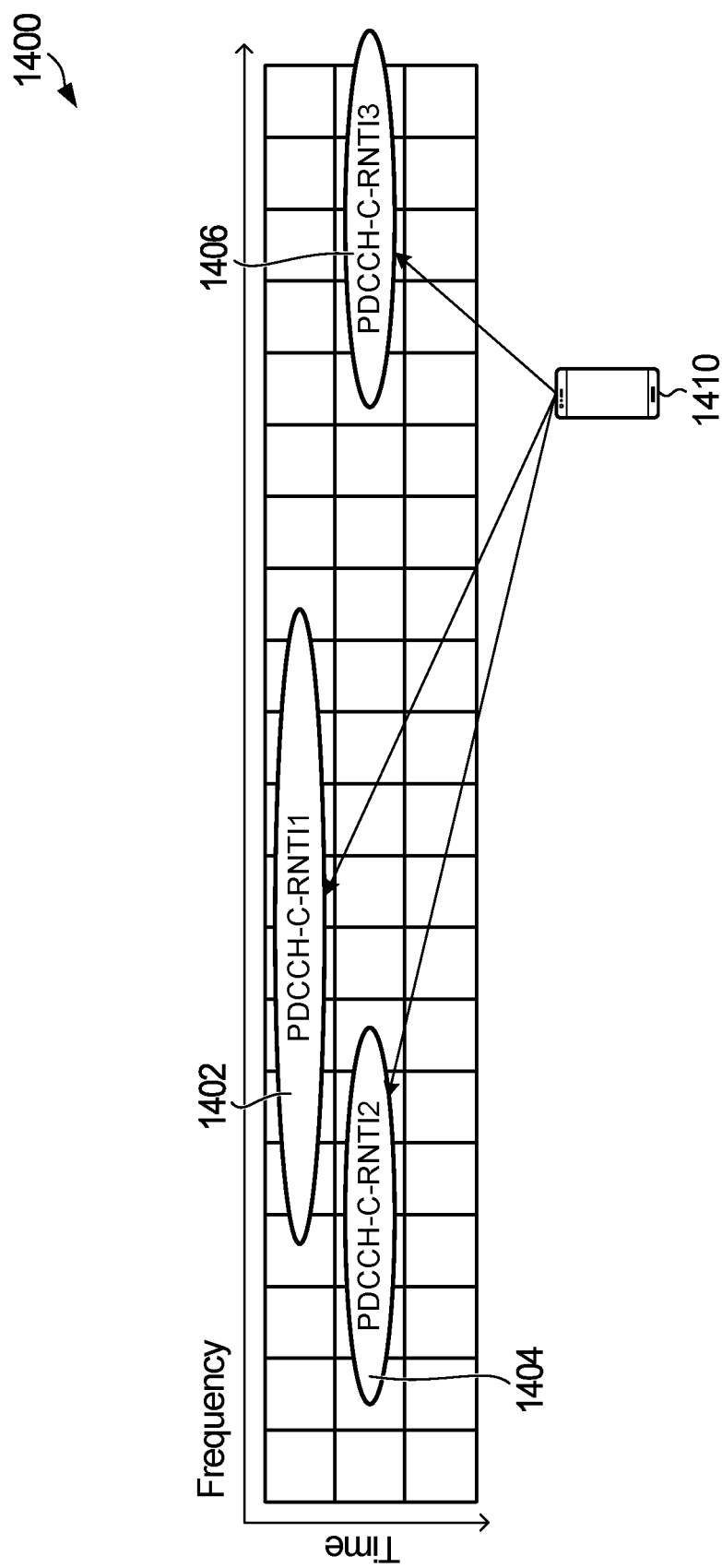
FIG. 14 is a block diagram illustrating PDCCH monitoring.

HARQ entities and processes are not the only CUE resources that may be limited. For example, FIG. 14 is a block diagram illustrating PDCCH monitoring, which also occupies CUE resources. A time-frequency resource grid 1400 incudes resources 1402, 1404, 1406 in which PDCCHs may be transmitted. Suppose that the UE 1410 is a CUE and there are three TUEs, with associated C-RNTIs, shown as C-RNTI1, C-RNTI2, and C-RNTI3. In general, it is expected that there will be fewer CUEs than TUEs, and therefore the scenario shown in FIG. 14 may be quite common.

The CUE 1410 cannot know the location of different PDCCH messages ahead of time, due to network scheduling. Without any mechanism for the CUE 1410 to determine which PDCCHs relate to TUEs that the CUE will actually be assisting, PDCCH monitoring can become a significant burden for a CUE. Consider that a typical number of monitored PDCCH candidates is 44 per slot. If a CUE is expected to assist N TUEs, with N=3 in the example shown in FIG. 14, then full PDCCH monitoring for the N TUEs would involve monitoring and blindly decoding 44*N PDCCH candidates, in addition to the PDCCH candidates that a CUE monitors for its own operation. Even assuming that a CUE such as 1410 is capable of monitoring an additional 44*N PDCCH candidates, then there may still be a question as to which particular TUEs the CUE will be assisting at any time.

In an embodiment, UE cooperation-based data block retransmission involves configuring a CUE to monitor PDCCH candidates using C-RNTIs other than the one assigned to the CUE. In the description of this embodiment below, it is assumed that both the CUE and each TUE are known to network equipment such as a serving base station. It should be appreciated, however, that features disclosed in the context of such fully in-coverage scenarios may apply to at least some degree to other scenarios as well.

For UE cooperation-based data block retransmission, a CUE monitors PDCCH candidates in search of PDCCH transmissions associated with one or more TUEs. These PDCCH transmissions carry DCI formats scrambled with UE identifiers, shown by way of example in FIG. 14 as C-RNTIs. Instead of monitoring all PDCCH candidates for every TUE, according to an embodiment the CUE is configured for targeted PDCCH monitoring to determine which PDSCH transmissions are to be transmitted again on a sidelink PSSCH. For example, network equipment may configure the CUE with the C-RNTI(s) of the target UE(s) that the CUE is assigned to assist. Such configuration of the CUE may use higher layer signaling, for example.

Any of various types of information for the purpose of carrying out PDCCH monitoring may be signaled to or otherwise provided to a CUE. Examples of such information include: one or more TUE C-RNTIs for DCI format detection by passing a Cyclic Redundancy Check (CRC); one or more Control Resource Sets (CORESETs) for locating time-frequency resources where PDCCH candidates for each TUE are allocated for monitoring purposes; and search spaces for the purpose of allocating PDCCH candidates and mapping PDCCH candidates on physical time-frequency resources. Search spaces can include, for example, any one or more of the following aspects: aggregation level; DCI format type; PDCCH monitoring periodicity; PDCCH monitoring offset; and PDCCH monitoring symbols.

In a fully in-coverage scenario in which the CUE(s) and TUE(s) are visible to network equipment, the network equipment may be involved in configuration of sidelinks, and may signal or otherwise provide sidelink information to a CUE. As an example, the network equipment may configure a CUE with a respective S-RNTI that is associated with each TUE C-RNTI.

With reference to FIG. 14, consider an example in which the CUE 1410 is configured to monitor for PDCCH messages for the three C-RNTIs as follows:
C-RNTI1: CORESET 1; Aggregation Level=8
C-RNTI2: CORESET 1; Aggregation Level=4
C-RNTI3: CORESET 1; Aggregation Level=8,
with the grid 1400 representing CORESET 1 for the purpose of this example.

With these configured parameters for targeted PDCCH monitoring, the CUE 1410 decodes PDCCH-C-RNTI1 at 1402 and PDCCH-C-RNTI2 at 1404, but not PDCCH-C-RNTI3 at 1406 because PDCCH-C-RNTI3 in the example shown does not match the configured aggregation level of 8.

In addition to other potential benefits of UE cooperation-based data block retransmission, targeted PDCCH monitoring may be beneficial for allowing CUEs to directly monitor for PDCCH transmissions intended for TUEs based on reduced degrees of freedom, such as any one or more of: aggregation level, DCI format type, and other parameters noted herein.

There may be other ways to reduce the impact of PDCCH monitoring on CUE resources. For example, further parameters such as PDCCH candidate index may be specified in CUE configuration or otherwise signaled or provided to a CUE to limit PDCCH monitoring. Another possible option is to configure certain CUE resources for the CUE itself and other CUE resources for UE cooperation. As an example, a CORESET 1 may be dedicated to UE cooperation and another CORESET 2 may be dedicated to the CUE itself. The CUE can then determine whether received transmissions are intended for the CUE or for a TUE.

CUE configurations may implement any of various UE cooperation strategies. For example, a CUE may assist one or more TUEs. A TUE may be assisted by one or more CUEs. Multiple CUEs can be provided with configurations to assist multiple TUEs such that several CUEs assist one TUE in one or more of: a Time Division Multiplex (TDM) manner, a Frequency Division Multiplex (FDM) manner, a Space Division Multiplex (SDM) manner, a Code Division Multiplex (CDM) manner, etc. In some embodiments, the number of C-RNTIs that a CUE is configured to monitor is defined based on UE capability, which may be signaled by the CUE to network equipment or otherwise available to the network equipment. UE capability that is relevant to UE cooperation-based data block retransmission may include, for example, one or more of: a UE cooperation (UC) feature, a UE category, a UE type, etc.

Figure 15:
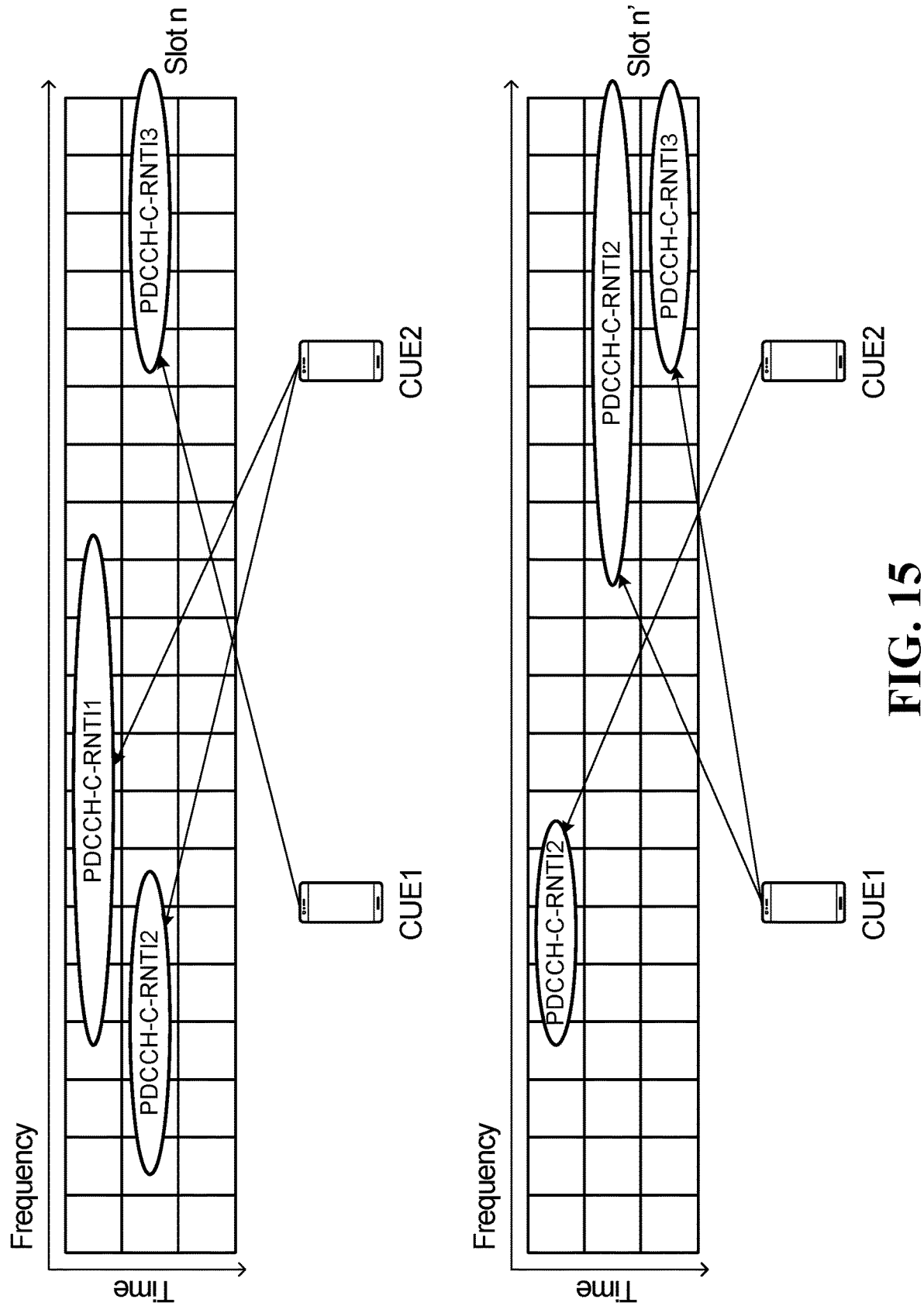
FIG. 15 is a block diagram illustrating an example of dynamic PDCCH monitoring by multiple UEs.

FIG. 15 is a block diagram illustrating an example of dynamic PDCCH monitoring by multiple CUEs. The dynamic PDCCH monitoring shown in FIG. 15 is slot-based, TDM-type UC, in which CUE1 monitors for PDCCH messages intended for C-RNTI3 in slot n, and for PDCCH messages for C-RNTI1 and C-RNTI3 in slot n'. Similarly, PDCCH monitoring by CUE2 changes between slots. CUE2 monitors for PDCCH messages intended for C-RNTI1 and C-RNTI2 in slot n, and for PDCCH messages for C-RNTI2 in slot n'. The example in FIG. 15 is slot-based, but PDCCH monitoring may also or instead change based on one or more other parameters.

Configuration changes are also possible. Configuration may be changed in a dynamic manner using Medium Access Control-Control Element (MAC-CE) commands for example, or in a semi-static manner such as by using higher-layer signaling such as Radio Resource Control (RRC) signaling.

Further embodiments of PDCCH monitoring behavior of CUEs are described below, by way of example in respect of how a UE may reports its capability to network equipment and how a UE may be configured by network equipment to perform UE cooperation-based retransmission. In the following examples: $M_{PDCCH}^{USS}$ denotes the number of monitored PDCCH candidates for UE-specific search spaces, $C_{PDCCH}^{USS}$ denotes the number of non-overlapped Control Channel Elements (CCEs), $M_{PDCCH}^{maxslot,\mu}$ denotes the maximum number of monitored PDCCH candidates for numerology p per given slot per given serving cell, $C_{PDCCH}^{maxslot,\mu}$ denotes the maximum number of non-overlapped CCEs for numerology p per given slot per given serving cell, $M_{PDCCH}^{totalslot,\mu}$ denotes the total number of PDCCH candidates a UE can monitor per slot, $C_{PDCCH}^{totalslot,\mu}$ denotes the total number of non-overlapped CCEs a UE can monitor per slot, $M_{PDCCH}^{CSS}$ denotes the number of monitored PDCCH candidates for common search spaces, $C_{PDCCH}^{CSS}$ denotes the number of non-overlapped CCEs for common search spaces, j denotes the search space set index, $S_{USS}(j)$ denotes the search space set indexed by j, $M_{S_{USS}(j)}^{(L)}$ denotes the number of counter PDCCH candidates for search space set $S_{USS}(j)$ using aggregation level L, $V_{CCE}(S_{USS}(j))$ denotes the set of non-overlapped CCEs for search space set $S_{USS}(j)$, C ($V_{CCE}(S_{USS}(j))$) denotes the cardinal of the set of non-overlapped CCEs $V_{CCE}(S_{USS}(j))$.

In a first embodiment, a CUE is a UE that reports a capability of monitoring a higher number of PDCCH candidates than the number of PDCCH candidates monitoring capability reported by a TUE. It is then up to the network implementation to configure a CUE in a manner that allows the CUE to perform UE cooperation-based retransmission as described herein. In this embodiment, the triggering condition for the CUE to perform UE cooperation-based retransmission mechanisms may be the configuration of search space sets, where each search space set is associated with at least one value of C-RNTI. Network equipment can then configure the CUE such that:
- For the one or more search space sets associated with the C-RNTI assigned to the CUE, the UE allocates a first set of PDCCH candidates to monitor PDCCH transmissions carrying DCI formats scrambled with the C-RNTI assigned to the CUE.
- For the one or more search space sets associated with a C-RNTI not assigned to the CUE, the UE allocates a second set of PDCCH candidates to monitor PDCCH transmission carrying DCI formats scrambled with the C-RNTI assigned to the TUE.

There may be restrictions on how different search space sets are configured, such as any one or more of the following for instance:
1) The UE is not expected to be configured with more than one value of C-RNTI per search space set at any given time.
2) The UE is not expected to be configured with N search space sets at any given time, where N is an integer number higher than 0.
3) The UE is not expected to be configured with M search space sets using the same value of C-RNTI at any given time, where M is an integer number higher than 0.

The corresponding PDCCH candidate allocation (or Control Channel Element (CCE) allocation) process is carried out in an embodiment per search space set associated to a given value of C-RNTI. In an embodiment, within the set of search space sets associated to the same value of C-RNTI, PDCCH candidates (or CCEs) are allocated per individual search space set until the maximum number of PDCCH candidates (or CCEs) has been reached. An example of pseudo-code for this expanded PDCCH candidate allocation (or CCE allocation) process is given below, where $S_{CUE-RNTI}^{USS}$ denotes the set of UE-specific search space sets associated to CUE-RNTI, with is the RNTI assigned to the CUE, and j denotes the index of the search space set:

Set $M_{PDCCH}^{USS} = \min(M_{PDCCH}^{maxslot,\mu}, M_{PDCCH}^{totalslot,\mu}) - M_{PDCCH}^{CSS}$
Set $C_{PDCCH}^{USS} = \min(C_{PDCCH}^{maxslot,\mu}, C_{PDCCH}^{totalslot,\mu}) - C_{PDCCH}^{CSS}$
Set j = 0
While $\Sigma_L M_{S_{USS}(j)}^{(L)} \le M_{PDCCH}^{USS}$ and $C(V_{CCE}(S_{USS}(j))) \le C_{PDCCH}^{USS}$
   If $S_{USS}(j) \in S_{CUE-RNTI}^{USS}$
     Allocate $\Sigma_L M_{S_{USS}(j)}^{(L)}$ PDCCH candidates for monitoring to USS set $S_{USS}(j)$
     $M_{PDCCH}^{USS} = M_{PDCCH}^{USS} - \Sigma_L M_{S_{USS}(j)}^{(L)}$;
     $C_{PDCCH}^{USS} = C_{PDCCH}^{USS} - C(V_{CCE}(S_{USS}(j)))$;
   j = j + 1;
End while
Set j = 0
While $\Sigma_L M_{S_{USS}(j)}^{(L)} \le M_{PDCCH}^{USS}$ and $C(V_{CCE}(S_{USS}(j))) \le C_{PDCCH}^{USS}$
   If $S_{USS}(j) \notin S_{CUE-RNTI}^{USS}$
     Allocate $\Sigma_L M_{S_{USS}(j)}^{(L)}$ PDCCH candidates for monitoring to USS set $S_{USS}(j)$
     $M_{PDCCH}^{USS} = M_{PDCCH}^{USS} - \Sigma_L M_{S_{USS}(j)}^{(L)}$;
     $C_{PDCCH}^{USS} = C_{PDCCH}^{USS} - C(V_{CCE}(S_{USS}(j)))$;
   j = j + 1;
End while In another embodiment, a CUE is a UE that reports a capability of monitoring a higher number of PDCCH candidates than the number of PDCCH candidates monitoring capability reported by a TUE. It is then up to the network implementation to configure a CUE in a manner that allows the CUE to perform UE cooperation-based retransmission, as described herein. In this embodiment, the triggering condition for the CUE to perform UE cooperation-based retransmission mechanisms may be the configuration of CORESETs, where each CORESET is associated with at least one value of C-RNTI. Network equipment can then configure the CUE such that:
- For the one or more search space sets associated with a CORESET that is associated with the C-RNTI assigned to the CUE, the UE allocates a first set of PDCCH candidates to monitor PDCCH transmissions carrying DCI formats scrambled with the C-RNTI assigned to the CUE.
- For the one or more search space sets associated with a CORESET that is associated with a C-RNTI not assigned to the CUE, the UE allocates a second set of PDCCH candidates to monitor PDCCH transmission carrying DCI formats scrambled with the C-RNTI assigned to the TUE.

There may be restrictions on how different CORESETs are configured, such as any one or more of the following for instance:
1) The UE is not expected to be configured with more than one value of C-RNTI per CORESET at any given time.
2) The UE is not expected to be configured with N CORESETs at any given time, where N is an integer number higher than 0.
3) The UE is not expected to be configured with M CORESETs using the same value of C-RNTI at any given time, where M is an integer number higher than 0.

The corresponding PDCCH candidate allocation (or CCE allocation) process has is carried out in an embodiment per search space set. In an embodiment, within the set of search space sets associated to a CORESET that is associated to a C-RNTI, PDCCH candidates (or CCEs) are allocated per individual search space set until the maximum number of PDCCH candidates (or CCEs) has been reached. An example of pseudo-code for this expanded PDCCH candidate allocation (CCE allocation) process is given below, where PDCCH candidate allocation is done per search space set and per CORESET, j denotes the search space set index, c denotes the CORESET index, $S_{USS,c}$ denotes the set of search space sets associated with CORESET c and $S_{USS}(j,c)$ denotes the search space set with index j and associated with CORESET c, MaxNrofControlResourceSets denotes the maximum number of CORESETs that can be configured per UE, MaxNrofSearchSpaces denotes the maximum number of Search Space Sets that can be configured per UE:

```
Set M_PDCCH^USS = min(M_PDCCH^maxslot,μ, M_PDCCH^totalslot,μ) - M_PDCCH^CSS
Set C_PDCCH^USS = min(C_PDCCH^maxslot,μ, C_PDCCH^totalslot,μ) - C_PDCCH^CSS
Set c = 0
While c ≤ MaxNrofControlResourceSets - 1
    Set j = 0
    While Σ_L M_{S_USS(j,c)}^(L) ≤ M_PDCCH^USS and C(V_CCE(S_USS(j, c))) ≤ C_PDCCH^USS and j ≤ MaxNrofSearchSpaces - 1
        Allocate Σ_L M_{S_USS(j,c)}^(L) PDCCH candidates for monitoring to USS set S_USS(j, c) in CORESET c M_PDCCH^USS = M_PDCCH^USS - Σ_L M_{S_USS(j,c)}^(L);

C_PDCCH^USS = C_PDCCH^USS - C (V_CCE(S_USS(j, c)));
        j = j + 1;
    End while
c = c + 1;
End while
```

In another embodiment, a CUE is a UE that reports a capability of monitoring a higher number of PDCCH candidates than the number of PDCCH candidates monitoring capability reported by a TUE. It is then up to the network implementation to configure a CUE in a manner that allows the CUE to perform UE cooperation-based retransmission, as described herein. In this embodiment, the triggering condition for the CUE to perform UE cooperation-based retransmission mechanisms may be the configuration of UE-specific DCI formats associated with a given value of RNTI. Network equipment can then configure the CUE such that:

For the one or more search space sets associated with a UE-specific DCI format that is associated with the C-RNTI assigned to the CUE, the UE allocates a first set of PDCCH candidates to monitor PDCCH transmissions carrying DCI formats scrambled with the C-RNTI assigned to the CUE.

For the one or more search space sets associated with a UE-specific DCI format that is associated with a C-RNTI not assigned to the CUE, the UE allocates a second set of PDCCH candidates to monitor PDCCH transmission carrying DCI formats scrambled with the C-RNTI assigned to the TUE.

There may be restrictions on how different DCI formats are configured, such as any one or more of the following for instance:

1) The UE is not expected to be configured with more than one value of C-RNTI per DCI format at any given time.

2) The UE is not expected to be configured to search for more than one type of DCI format per value of C-RNTI.

The corresponding PDCCH candidate allocation (or CCE allocation) process is carried out per DCI format and per search space set. In an embodiment, within the set of search space sets associated to a UE-specific DCI format that is associated to a C-RNTI, PDCCH candidates (or CCEs) are allocated per individual search space set until the maximum number of PDCCH candidates (or CCEs) has been reached. An example of pseudo-code for this expanded PDCCH candidate allocation (or CCE allocation) process is given below, where PDCCH candidate allocation is done per search space set and per CORESET, j denotes the search space set index, df denotes the DCI format index, $S_{USS,c}$ denotes the set of search space sets associated with DCI format df and $S_{USS}(j, df)$ denotes the search space set with index j and associated with DCI format df, MaxNrofDCIFormats denotes the maximum number of DCI formats that can be configured per PDCCH candidate, MaxNrofSearchSpaces denotes the maximum number of Search Space Sets that can be configured per UE:

```
Set M_PDCCH^USS = min(M_PDCCH^maxslot,μ, M_PDCCH^totalslot,μ) - M_PDCCH^CSS
Set C_PDCCH^USS = min(C_PDCCH^maxslot,μ, C_PDCCH^totalslot,μ) - C_PDCCH^CSS
Set c = 0
While df ≤ MaxNrofDCIFormats - 1
    Set j = 0
    While Σ_L M_{S_USS(j,df)}^(L) ≤ M_PDCCH^USS and C(V_CCE(S_USS(j,df))) ≤ C_PDCCH^USS and j ≤ MaxNrofSearchSpaces - 1
        Allocate Σ_L M_{S_USS(j,df)}^(L) PDCCH candidates for monitoring to USS set S_USS(j, df) using DCI format df
        M_PDCCH^USS = M_PDCCH^USS - Σ_L M_{S_USS(j,df)}^(L);
        C_PDCCH^USS = C_PDCCH^USS - C(V_CCE(S_USS(j,df)));
        j = j + 1;
    End while
df = df + 1;
End while
```

In another embodiment, a CUE is a UE that reports a capability of monitoring a higher number of PDCCH candidates than the number of PDCCH candidates monitoring capability reported by a TUE. It is then up to the network implementation to configure a CUE in a manner that allows the CUE to perform UE cooperation-based retransmission, as described herein. In this embodiment, the triggering condition for the CUE to perform UE cooperation-based retransmission mechanisms may be the configuration of one or more PDCCH configuration objects respectively associated with one value of C-RNTI. Network equipment can then configure the CUE such that:

For the one or more search space sets associated with a given PDCCH configuration object associated with the C-RNTI assigned to the CUE, the UE allocates a first set of PDCCH candidates to monitor PDCCH transmissions carrying DCI formats scrambled with the C-RNTI assigned to the CUE.

For the one or more search space sets associated with a given PDCCH configuration object associated with a C-RNTI not assigned to the CUE, the UE allocates a second set of PDCCH candidates to monitor PDCCH transmission carrying DCI formats scrambled with the C-RNTI assigned to the TUE.

There may be restrictions on how different PDCCH configuration objects are configured, such as any one or more of the following for instance:

1) The UE is not expected to be configured with more than one value of C-RNTI per PDCCH configuration object at any given time.

2) The UE is not expected to be configured with more than two PDCCH configuration objects to be configured at any given time.
3) The UE is not expected to be configured such that any search space set to be associated with more than one PDCCH configuration object at any given time.

The corresponding PDCCH candidate allocation (CCE allocation) process is carried out per DCI format and per search space set. In an embodiment, within the set of search space sets associated to a UE-specific DCI format associated to a C-RNTI, PDCCH candidates (or CCEs) are allocated per individual search space set until the maximum number of PDCCH candidates (or CCEs) has been reached.

For at least these further PDCCH monitoring behavior embodiment above, a UE may assume a default behavior in the absence of certain parameters. For instance:
1) If the UE is configured with a set of search space sets such that a first set of one or more search space sets is configured such that no associated C-RNTI is provided, then the UE may assume that the one or more search space sets in that first set are associated with the C-RNTI assigned to the UE.
2) If the UE is configured with a set of search space sets associated with a CORESET for which no associated C-RNTI is provided, then the UE may assume that those search space sets are associated with the C-RNTI assigned to the UE.
3) If the UE is configured with a set of search space sets associated with a DCI format for which no associated C-RNTI is provided, then the UE may assume that those search space sets are associated with the C-RNTI assigned to the UE.
4) If the UE is configured with a set of search space sets associated with a PDCCH configuration object for which no associated C-RNTI is provided, then the UE may assume that those search space sets are associated with the C-RNTI assigned to the UE.

Combinations and variations of these embodiments can be used to derive triggering conditions for the UE to use UE cooperation-based retransmission, PDCCH monitoring behavior for CUEs, PDCCH allocation processes and other restrictions to help ensure that UE behaviors remain consistent and backward-compatible.

Figure 16:
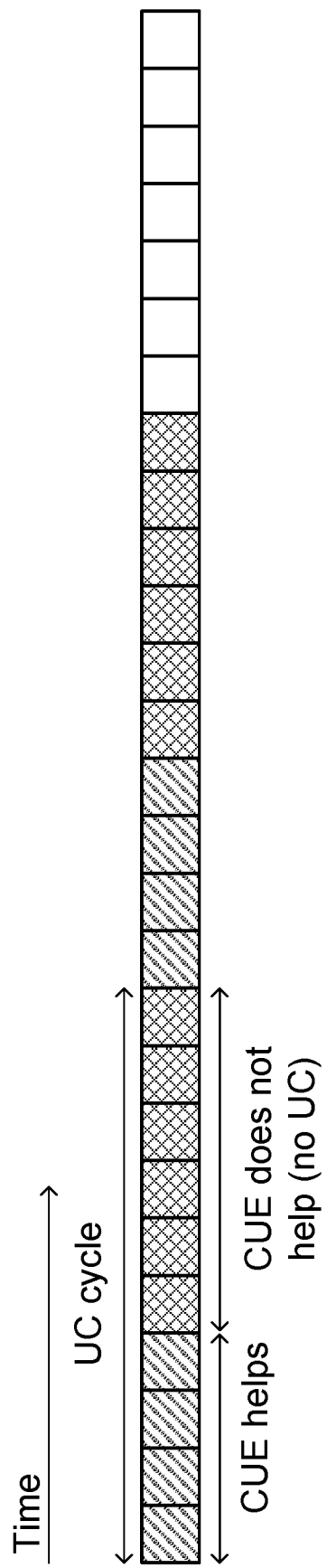
FIG. 16 is a block diagram illustrating an example of a time-based UE cooperation schedule.

CUE assistance of a particular TUE may be shared by multiple CUEs in a TDM manner, as noted above. FIG. 16 is a block diagram illustrating an example of a time-based UE cooperation schedule, according to which CUE participation in UE cooperation changes over time. Within a UC cycle or helping cycle for a CUE, for a certain period of time the CUE helps one or more TUEs by transmitting PSSCH transmissions to the TUE(s) and outside of that time period the CUE reverts back to normal or standard UE behavior and does not help TUEs.

The helping/non-helping pattern in FIG. 16 is an illustrative example. Other patterns are possible. For example, a helping time period and a non-helping time period may have different relative lengths than shown, and/or either or both of a helping time period and a non-helping time period may include multiple non-continuous time periods within a UC cycle.

UC cycle configuration, which may include such parameters as any one or more of: length of an overall UC cycle, length of a helping time period during which the CUE participates in UC, length of a non-helping time period during which the CUE does not participate in UC, and helping/non-helping time period pattern, can be changed dynamically or semi-statically in some embodiments, by using higher-layer signaling, for example. RRC or MAC-CE signaling are examples of such higher-layer signaling.

Potential benefits of a time-based UE cooperation schedule as shown by way of example in FIG. 16 may include reduced CUE power consumption during non-helping time periods. Embodiments that implement a time-based UE cooperation schedule may also realize other benefits of UE cooperation-based data block retransmission.

Figure 17A:
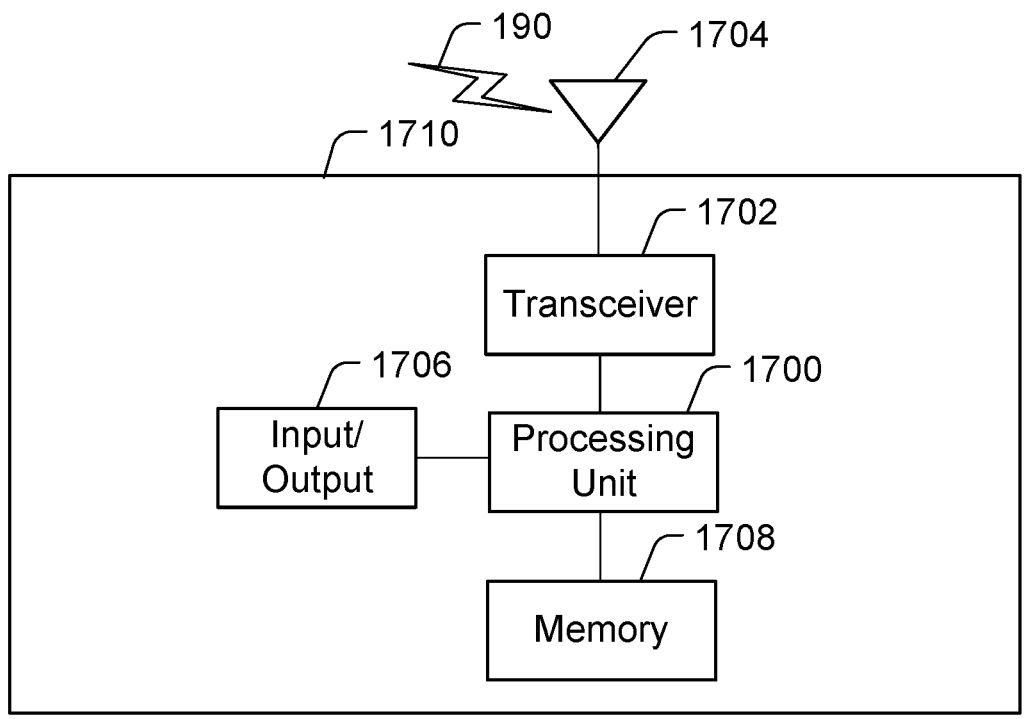
FIGS. 17A and 17B are block diagrams illustrating example devices that may implement embodiments according to this disclosure.
Figure 17B:
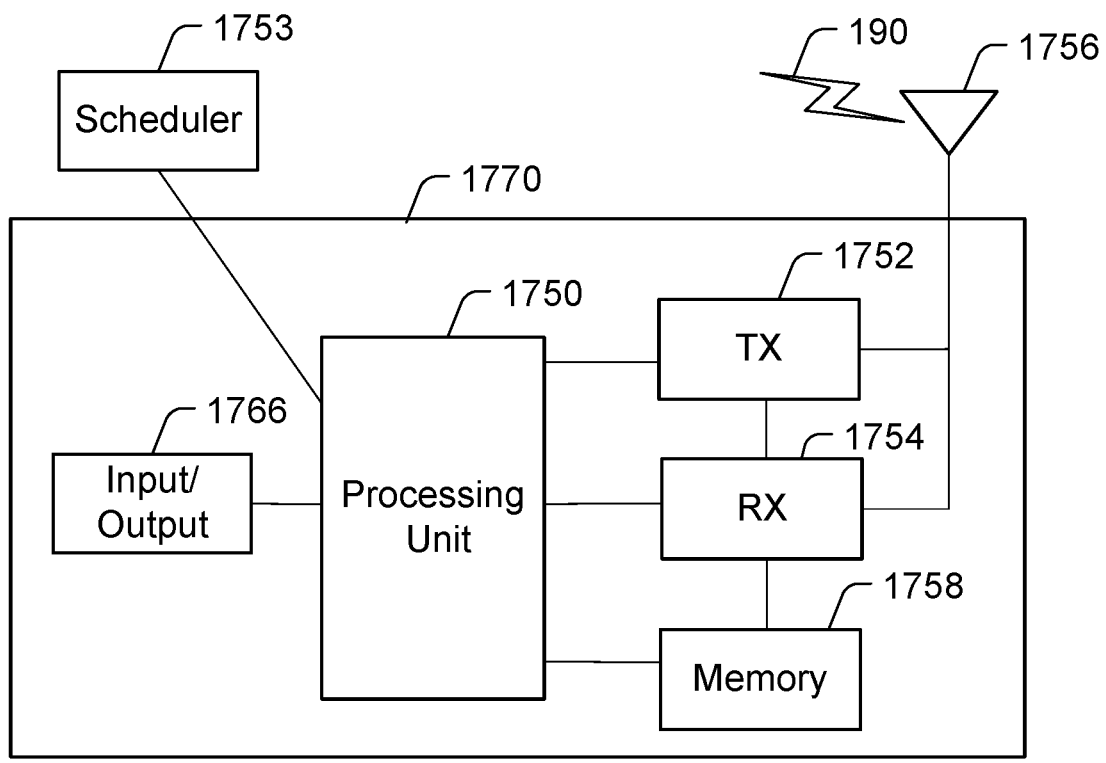

FIGS. 17A and 17B are block diagrams illustrating example devices that may implement embodiments according to this disclosure.

FIG. 17A illustrates an example ED 1710, and FIG. 17B illustrates an example base station 1770. These components could be used in the system 100 (FIG. 1) or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input processing, output processing, or any other functionality enabling the ED 1710 to operate in a communication system. The processing unit 1700 may also be configured to implement some or all of the functionality or embodiments described in more detail herein. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless transmission and/or processing signals received wirelessly or by wire. Each antenna 1704 includes any suitable structure for transmitting and/or receiving wireless signals. One or multiple transceivers 1702 could be used in the ED 1710, and one or multiple antennas 1704 could be used in the ED 1710. Although shown as a single functional unit, a transceiver 1702 could be implemented using at least one transmitter and at least one separate receiver.

The ED 1710 further includes one or more input/output devices 1706 or interfaces. The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software instructions or modules configured to implement some or all of the functionality or embodiments described above and that are executed by the processing unit(s) 1700. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transmitter 1752, at least one receiver 1754, one or more antennas 1756, at least one memory 1758, and one or more input/output devices or interfaces 1766. A transceiver, not shown, may be used instead of the transmitter 1752 and receiver 1754. A scheduler 1753 may be coupled to the processing unit 1750. The scheduler 1753 may be included within or operated separately from the base station 1770. The processing unit 1750 implements various processing operations of the base station 1770, such as signal coding, data processing, power control, input processing, output processing, or any other functionality. The processing unit 1750 can also be configured to implement some or all of the functionality or embodiments described in more detail herein. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transmitter 1752 includes any suitable structure for generating signals for wireless transmission to one or more EDs or other devices. Each receiver 1754 includes any suitable structure for processing signals received wirelessly or by wire from one or more EDs or other devices. Although shown as separate components, at least one transmitter 1752 and at least one receiver 1754 could be combined into a transceiver. Each antenna 1756 includes any suitable structure for transmitting, receiving, or both transmitting and receiving wireless signals. While a common antenna 1756 is shown here as being coupled to both the transmitter 1752 and the receiver 1754, one or more antennas 1756 could be coupled to the transmitter(s) 1752, and one or more separate antennas 1756 could be coupled to the receiver(s) 1754. Each memory 1758 includes any suitable volatile and/or non-volatile storage and retrieval device(s) such as those described above in connection to the ED 1710. The memory 1758 stores instructions and data used, generated, or collected by the base station 1770. For example, the memory 1758 could store software instructions or modules configured to implement some or all of the functionality or embodiments described herein and that are executed by the processing unit(s) 1750.

Each input/output device 1766 facilitates interaction with a user or other devices (network communications) in the network. Each input/output device 1766 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 1708 and the memory 1758, for example, could include one or more physical memory devices. Solid-state memory devices such as a Flash memory device could be implemented. Memory devices with movable or even removable storage media could also or instead be implemented.

FIG. 17A and FIG. 17B illustrate examples of a UE and network equipment, respectively, in which embodiments could be implemented. More generally, an apparatus may include a communication interface, a processor, and a non-transitory computer readable storage medium. Examples of a communication interface include the transceiver 1702 in FIG. 17A and a transmitter 1752 or a receiver 1754 in FIG. 17B. Examples of a processor and a non-transitory computer readable storage medium include the processing unit 1700, 1750 and memory 1708, 1758 in FIG. 17A or FIG. 17B. Such an apparatus may be a UE, including a TUE or a CUE such as a relay UE or a helping remote UE. Another example of an apparatus is network equipment, which may be a gNB, a TRP, a base station, or any other type of network equipment referenced herein. In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to cause a processor to perform a method that involves receiving, by a first UE in a wireless communication network, a transmission comprising a data block that is destined for a second UE in the wireless communication network; and transmitting the data block toward the second UE according to a data block retransmission mechanism to enable the second UE to identify the data block transmitted from the first UE as being one of multiple concurrent transmissions of the data block according to the data block retransmission mechanism. The concurrent transmissions of the data block are processable by the second UE in combination to determine a reception status of the data block.

The feature "concurrent transmissions" indicates that transmissions are concurrent in the sense that they can all be used to determine reception status at a TUE. This does not necessarily, or only, mean that transmissions of a data block are time concurrent. For example, a gNB transmission and a relay UE transmission may be at different times, but still be concurrent in the sense of a HARQ-ACK cycle in which they can all be used to determine reception status and generate HARQ-ACK feedback.

Some embodiments include any one or more of the following features, examples of which are disclosed elsewhere herein, in any of various combinations:

the programming further includes instructions for receiving, by the first UE from network equipment in the communication network, signaling that is indicative of a configuration of the first UE for the data block retransmission mechanism;

the data block retransmission mechanism involves a HARQ mechanism associated with a HARQ identifier, and the transmitting involves transmitting the data block with an indication of the HARQ identifier to enable the second UE to identify the data block transmitted from the first UE as being one of the concurrent transmissions of the data block based on the HARQ identifier;

the transmitting involves transmitting the data block in a time slot associated with the data block retransmission mechanism, to enable the second UE to identify the data block transmitted from the first UE as being one of the concurrent transmissions of the data block based on the time slot;

the transmitting involves transmitting the data block using an antenna port associated with the data block retransmission mechanism, to enable the second UE to identify the data block transmitted from the first UE as being one of the concurrent transmissions of the data block based on the antenna port;

the transmitting involves transmitting the data block using a PRB set associated with the data block retransmission mechanism, to enable the second UE to identify the data block transmitted from the first UE as being one of the plurality of concurrent transmissions of the data block based on the PRB set;

the data block retransmission mechanism involves a HARQ mechanism associated with a HARQ entity at the first UE, and the programming further includes instructions for mapping the HARQ entity at the first UE to a HARQ entity at the second UE;

the programming further includes instructions for targeted monitoring, by the first UE, of control signaling such as PDCCH signaling in the wireless communication network to detect control signaling associated with another one of the concurrent transmissions of the data block to the second UE;

the programming further includes instructions for determining, by the first UE, based on a time schedule, whether the first UE is to participate in the data block retransmission mechanism, and the transmitting is dependent upon determining that the first UE is to participate in the data block retransmission mechanism;

the concurrent transmissions of the data block include the data block transmitted from the first UE, and one or both of: a transmission of the data block to the second UE by network equipment in the wireless communication network and a transmission of the data block to the second UE by a third UE in the wireless communication network.

These programming examples relate to CUEs. TUE embodiments are also possible. Programming instructions in a TUE embodiment may cause a processor to perform a method that involves receiving, by a second UE from a first UE and at least one other transmitter in a wireless communication network, multiple concurrent transmissions of a data block according to a data block retransmission mechanism; and determining, by the second UE, reception status of the data block based on processing of the plurality of concurrent transmissions in combination.

In network equipment embodiments, programming instructions may cause a processor to perform such operations as determining, by network equipment in a wireless communication network that further includes a first UE and a second UE, that a data block is to be transmitted to the second UE; and concurrently transmitting the data block to at least the first UE and the second UE according to a data block retransmission mechanism to enable the second UE to identify the data block transmitted from the first UE and from the network equipment as being multiple concurrent transmissions of the data block according to the data block retransmission mechanism. The concurrent transmissions of the data block are processable by the second UE in combination to determine a reception status of the data block.

Other features that could be implemented in apparatus embodiments and/or in computer program product embodiments may be or become apparent, for example, from the embodiments disclosed elsewhere herein. At least some features listed or otherwise disclosed herein for CUEs may also or instead be applied TUE embodiments or network equipment embodiments.

Figure 18:
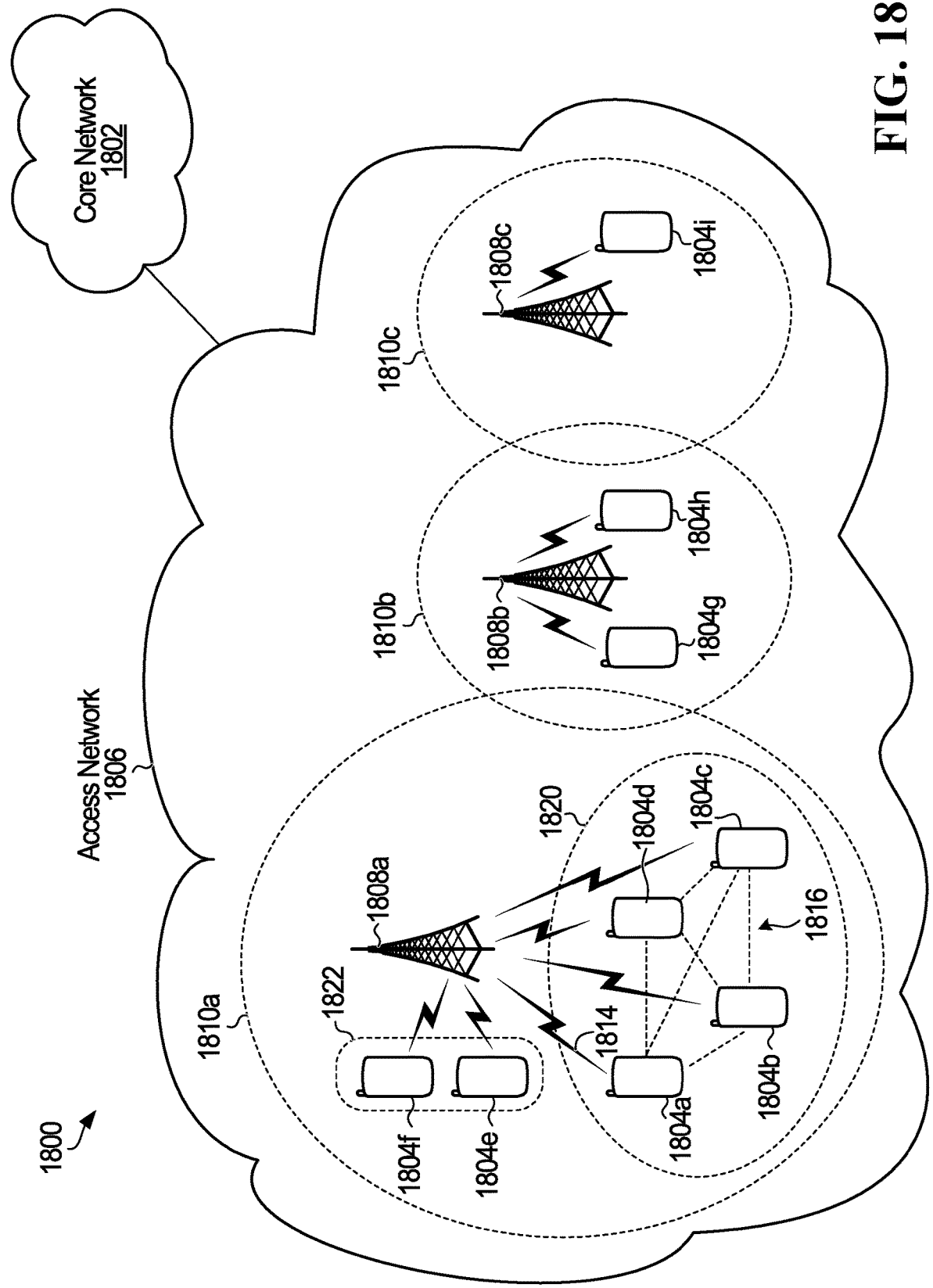
FIG. 18 is a block diagram illustrating an example of a telecommunications network according to one embodiment.

FIG. 18 is a block diagram illustrating an example of a telecommunications network 1800 according to one embodiment. The telecommunications network 1800 includes a core network 1802 and an access network 1806. The access network 1806 serves a plurality of UEs 1804*a*, 1804*b*, 1804*c*, 1804*d*, 1804*e*, 1804*f*, 1804*g*, 1804*h*, and 1804*i*. The access network 1806 is an Evolved Universal Terrestrial Access (E-UTRA) network in some embodiments. Another example of an access network 1806 is a cloud access network (C-RAN). The access network 1806 includes a plurality of BSs 1808*a*, 1808*b*, and 1808*c*. The BSs 1808*a-c* each provide a respective wireless coverage area 1810*a*, 1810*b*, and 1810*c*, also referred to as a cell. Each of the BSs 1808*a-c* could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 1808*a-c* are each connected to the core network 1802, either directly or through one or more central processing hubs, such as servers. The BSs 1808*a-c* could serve as a gateway between the wireline and wireless portion of the access network 1806.

Each one of BSs 1808*a-c* may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1804*a-i* access the telecommunications network 1800 using the access network 1806 by wirelessly communicating with one or more of the BSs 1808*a-c*.

UEs 1804*a-d* are in close proximity to each other. Although the UEs 1804*a-d* can each wirelessly communicate with the BS 1808*a*, they can also directly communicate with each other, as represented at 1816. The communications represented at 1816 are direct communications between UEs, such as sidelink communications as disclosed herein, that do not go through an access network component, such as a BS. As shown in FIG. 18, UE to UE communications 1816 are directly between the UEs 1804*a-d* and are not routed through the BS 1808*a*, or any other part of the access network 1806. Communications 1816 may also be referred to as lateral communications. In embodiments disclosed herein, UE to UE communications use a sidelink channel and a sidelink air interface. On the other hand, a communication between an access network component, such as BS 1808*a*, and a UE, as in communication 1814, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 1816, the UEs 1804a-d may be able to assist with wireless communications between the UEs 1804a-d and the BS 1808a. For example, multiple UEs, or a BS and one or more UEs, may implement data block retransmission as disclosed herein. For example, the BS 1808a may transmit a data packet that is destined for the UE 1804d not only to the UE 1804a, but also to one or more of the UEs 1804b-d for retransmission to the UE 1804a using sidelink communications 1816. As another example, if the UE 1804a moves out of wireless coverage area 1810a, then two or more of the other UEs 1804b-d could forward data blocks between the UE 1804a and the BS 1808a according to a data block retransmission mechanism as disclosed herein.

The UEs 1804a-d form a UE group 1820 in some embodiments. It should be noted, however, that UE cooperation and data block retransmission as disclosed herein are not dependent upon prior establishment of UE groups.

The access network 1806 could assign a group identifier (ID) to the UE group 1820. The UE group ID may allow the access network 1806 to address the UE group 1820 as a whole and distinguish the UE group 1820 from other UE groups. The UE group ID may also be used to broadcast information within the UE group; that is, address all other UEs within the UE group 1820. The UE group 1820 may form a logical or virtual device mesh in which the members of the UE group 1820 communicate amongst themselves using UE communications over an sidelink air interface, but the UE group 1820 as a whole acts as a single distributed virtual transceiver with respect to the access network 1806. The UE group ID may be a group radio network temporary identifier (G-RNTI), for example.

When a particular UE in the UE group 1820, such as the UE 1804c, is being assisted or is to be assisted with wireless communication between that UE and the BS 1808a, then the other UEs 1804a, 1804b, and 1804d in the group 1820 may be considered candidates to be a relay UE or a helping remote UE. In a group-based embodiment, the subset of UEs in that actually assist the UE 1804c form a cooperation active set or a cooperation group. The cooperation active set may be dynamically selected to assist the UE 1804c.

In UE group 1820, UEs 1804a, 1804b, and 1804d form a cooperation candidate set. If UEs 1804a and 1804b actually assist the UE 1804c, then the UEs 1804a and 1804b form the cooperation active set. As UEs 1804a-d move around, some may leave the UE group 1820. UE movement may also or instead result in other UEs joining the UE group 1820. Therefore, the cooperation candidate set may change over time. For example, the cooperation candidate set may change semi-statically. The UE group 1820 may also be terminated by the network 1806, for example, if the network determines that there is no longer a need or opportunity for the UE group 1820 to provide assistance in wireless communication between the BS 908a and members of the UE group 1820.

There may be more than one UE group. For example, UEs 1804e and 1804f in FIG. 18 form another UE group 1822.

Figure 19:
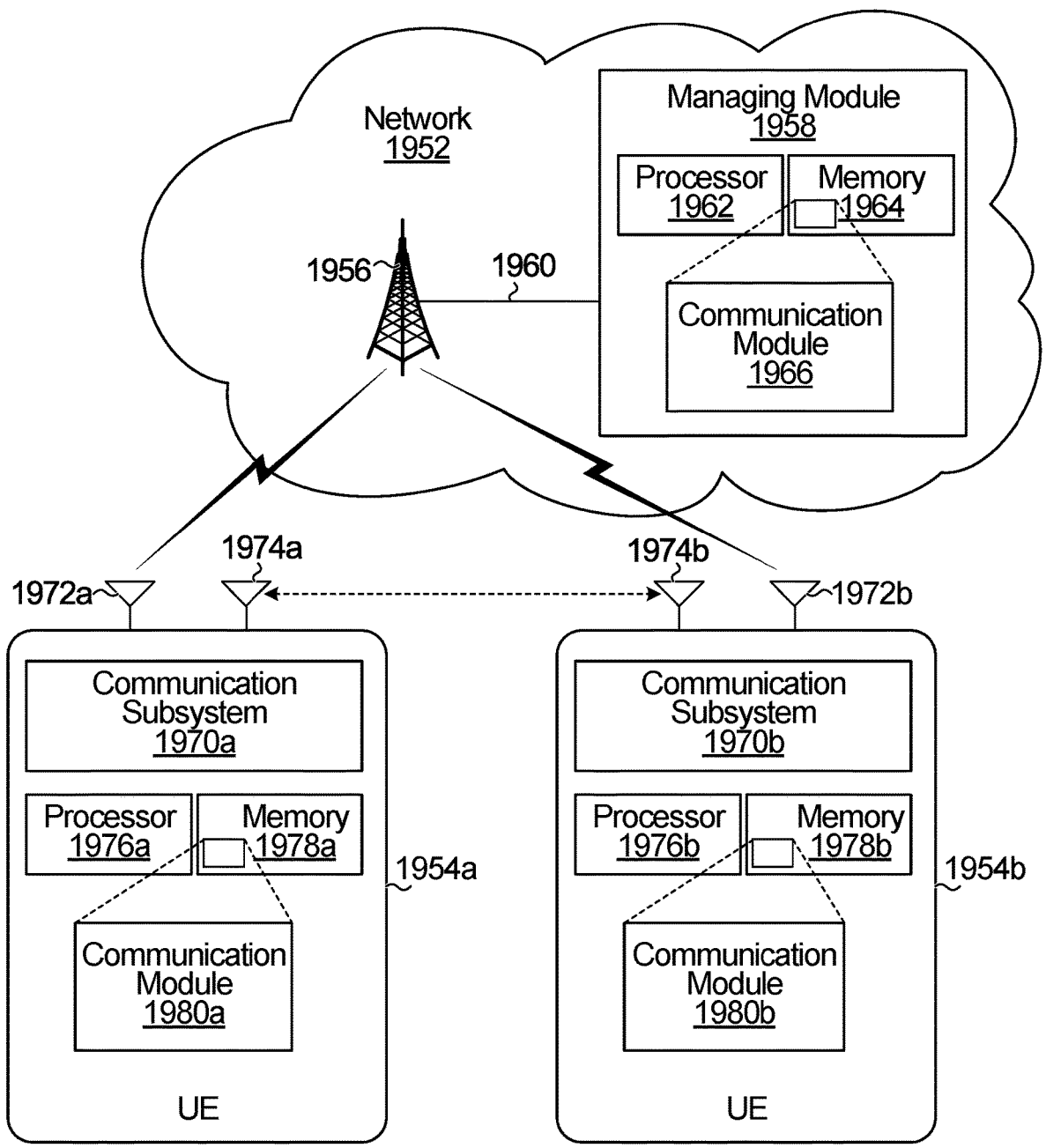
FIG. 19 is a block diagram illustrating an example of a network serving two UEs.

FIG. 19 is a block diagram illustrating an example of a network 1952 serving two UEs 1954a and 1954b, according to one embodiment. The network 1952 may be the access network 1806 from FIG. 18, and the two UEs 1954a and 1954b may be two of the four UEs 1804a-d in FIG. 18, or the UEs 1954a and 1954b may be UEs 1804e and 1804f in FIG. 18. However, more generally this need not be the case, which is why different reference numerals are used in FIG. 19.

The network 1952 includes a BS 1956 and a managing module 1958. The managing module 1958 instructs the BS 1956 to perform actions. The managing module 1958 is illustrated as physically separate from the BS 1956 and coupled to the BS 1956 via a communication link 1960. For example, the managing module 1958 may be part of a server in the network 1952. Alternatively, the managing module 1958 may be part of the BS 1956.

The managing module 1958 includes a processor 1962, a memory 1964, and a communication module 1966. The communication module 1966 is implemented by the processor 1962 when the processor 1962 accesses and executes a series of instructions stored in the memory 1964, the instructions defining the actions of the communication module 1966. When the instructions are executed, the communication module 1966 causes the BS 1956 to perform the actions described herein so that the network 1952 can establish, coordinate, instruct, or control relay, and possibly perform such operations in respect of UE groups. Alternatively, the communication module 1966 may be implemented using dedicated circuitry, such as an application specific integrated circuit (ASIC) or a programmed field programmable gate array (FPGA).

The UE 1954a includes a communication subsystem 1970a, two antennas 1972a and 1974a, a processor 1976a, and a memory 1978a. The UE 1954a also includes a communication module 1980a. The communication module 1980a is implemented by the processor 1976a when the processor 1976a accesses and executes a series of instructions stored in the memory 1978a, the instructions defining the actions of the communication module 1980a. When the instructions are executed, the communication module 1980a causes the UE 1954a to perform actions described herein in relation to one or more of a TUE and a CUE such as a relay UE or a helping remote UE. Features related to establishing and participating in a UE group may also be supported. Alternatively, the module 1980a may be implemented by dedicated circuitry, such as an ASIC or an FPGA.

The communication subsystem 1970a includes processing circuitry, transmit circuitry, and receive circuitry for sending messages from and receiving messages at the UE 1954a. Although one communication subsystem 1970a is illustrated, the communication subsystem 1970a may be multiple communication subsystems. Antenna 1972a transmits wireless communication signals to, and receives wireless communications signals from, the BS 1956. Antenna 1974a transmits sidelink communication signals to, and receives sidelink communication signals from, other UEs, including UE 1954b. In some implementations there may not be two separate antennas 1972a and 1974a. A single antenna may be used. Alternatively, there may be several antennas, but not separated into antennas dedicated only to sidelink communication and antennas dedicated only to communicating with the BS 1956.

SL communications could be over Wi-Fi, in which case the antenna 1974a may be a Wi-Fi antenna. Alternatively, the sidelink communications could be over Bluetooth™, in which case the antenna 1974a may be a Bluetooth™ antenna. Sidelink communications could also or instead be over licensed or unlicensed spectrum.

The UE 1954*b* includes the same components described above with respect to the UE 1954*a*. That is, UE 1954*b* includes communication subsystem 1970*b*, antennas 1972*b* and 1974*b*, processor 1976*b*, memory 1978*b*, and communication module 1980*b*.

FIGS. 18 and 19 illustrate systems in which embodiments could be implemented. In some embodiments, a UE includes a processor, such as 1976*a*, 1976*b* in FIG. 19, and a non-transitory computer readable storage medium, such as 1978*a*, 1978*b* in FIG. 19, storing programming for execution by the processor. A non-transitory computer readable storage medium could also or instead be provided separately, as a computer program product. Examples are provided elsewhere herein.

Embodiments are described above primarily in the context of example apparatus or systems. Other embodiments are also possible.

Figure 20:
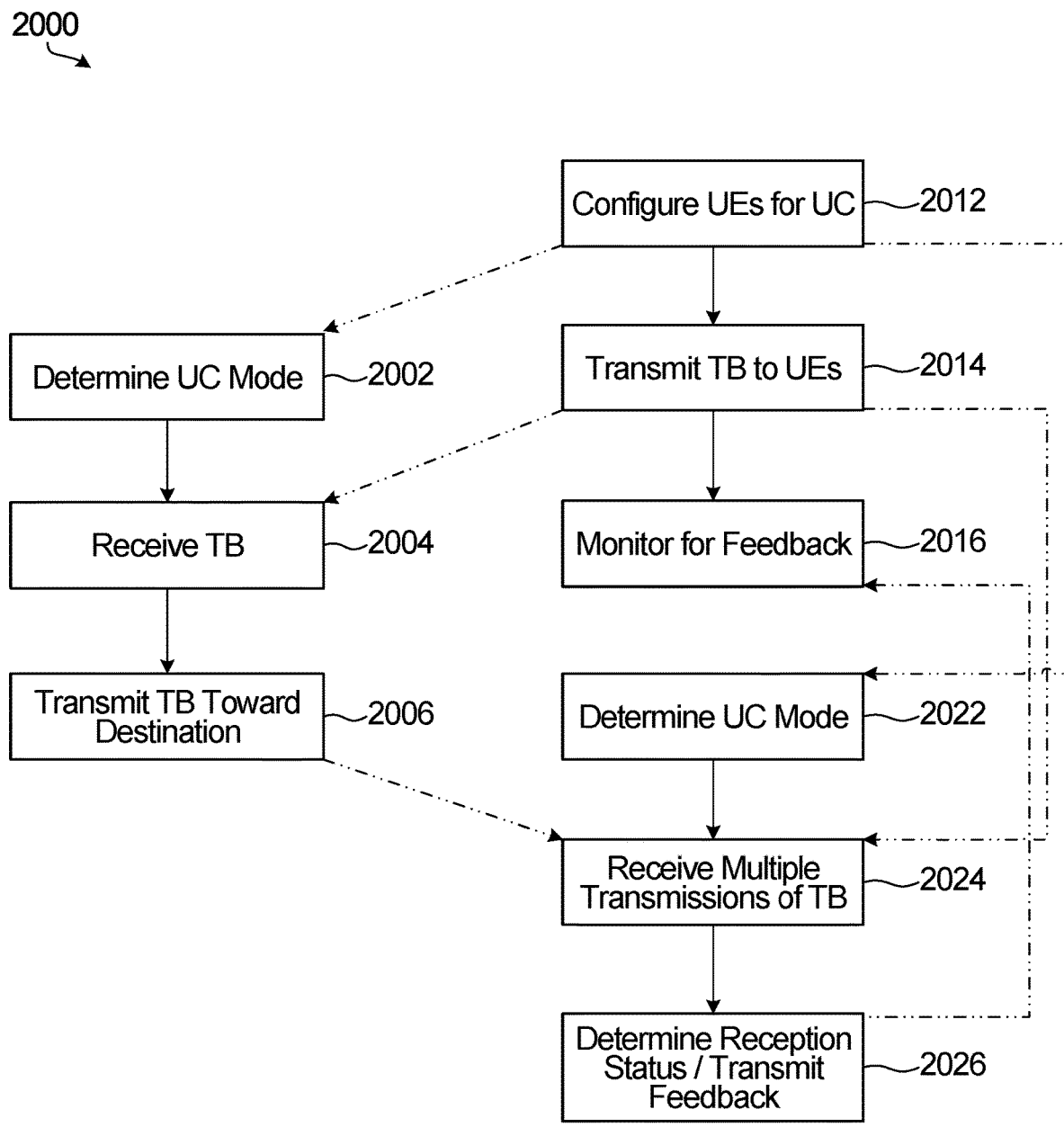
FIG. 20 is a flow diagram illustrating a method according to another embodiment.

FIG. 20 is a flow diagram illustrating a method according to another embodiment. The example method 2000 includes operations at a CUE, also referenced herein as a first UE, operations at network equipment, and operations at a TUE, also referenced herein as a first UE. CUE operations are shown at 2002, 2004, 2006, network equipment operations are shown at 2012, 2014, 2016, and TUE operations are shown at 2022, 2024, 2026. Dashed-line arrows in FIG. 20 illustrate interactions between the UEs and between each UE and the network equipment.

Considering the CUE operations, 2004 shows an operation of receiving, by a first UE in a wireless communication network, a transmission comprising a data block, also referred to by way of example herein as a TB, that is destined for a second UE in the wireless communication network. 2006 shows an operations of transmitting the data block toward the second UE according to a data block retransmission mechanism, to enable the second UE to identify the data block transmitted from the first UE as being one of multiple concurrent transmissions of the data block according to the data block retransmission mechanism. The transmission at 2006 may include a different version, such as a different RV, of the TB that is received at 2004. The concurrent transmissions of the data block, including the transmission at 2006, are processable by the second UE in combination to determine a reception status of the data block.

An operation of determining UC mode is shown at 2002 as an example of another CUE operation that may be performed or supported in other embodiments. For example, the operation at 2002 may involve receiving, by the first UE from network equipment in the communication network, signaling that is indicative of a configuration of the first UE for the data block retransmission mechanism. In another embodiment, the operation at 2002 involves determining, by the first UE, based on a time schedule, whether the first UE is to participate in the data block retransmission mechanism. Transmitting a received TB at 2006 is then dependent upon determining that the first UE is to participate in the data block retransmission mechanism.

Some embodiments include any one or more of the following features, in any of various combinations:

the data block retransmission mechanism involves a HARQ mechanism associated with a HARQ identifier, and the transmitting involves transmitting the data block with an indication of the HARQ identifier to enable the second UE to identify the data block transmitted from the first UE as being one of the concurrent transmissions of the data block based on the HARQ identifier;

the transmitting involves transmitting the data block in a time slot associated with the data block retransmission mechanism, to enable the second UE to identify the data block transmitted from the first UE as being one of the concurrent transmissions of the data block based on the time slot;

the transmitting involves transmitting the data block using an antenna port associated with the data block retransmission mechanism, to enable the second UE to identify the data block transmitted from the first UE as being one of the concurrent transmissions of the data block based on the antenna port;

the transmitting involves transmitting the data block using a PRB set associated with the data block retransmission mechanism, to enable the second UE to identify the data block transmitted from the first UE as being one of the plurality of concurrent transmissions of the data block based on the PRB set;

the data block retransmission mechanism involves a HARQ mechanism associated with a HARQ entity at the first UE, and the method further includes mapping the HARQ entity at the first UE to a HARQ entity at the second UE;

targeted monitoring, by the first UE, of control signaling such as PDCCH signaling in the wireless communication network to detect control signaling associated with another one of the concurrent transmissions of the data block to the second UE;

the concurrent transmissions of the data block include the data block transmitted from the first UE, and one or both of: a transmission of the data block to the second UE by network equipment in the wireless communication network and a transmission of the data block to the second UE by a third UE in the wireless communication network.

These method examples relate to CUEs. TUE embodiments are also possible. A method performed by a TUE may involve receiving at 2024, by a second UE from a first UE and at least one other transmitter such as network equipment in a wireless communication network, multiple concurrent transmissions of a data block according to a data block retransmission mechanism; and determining at 2026, by the second UE, reception status of the data block based on processing of the plurality of concurrent transmissions in combination. Feedback may be transmitted, to network equipment for example, by the second UE as shown at 2026. Like a CUE, a TUE may determine at 2022 a UC mode. This determination may be based on UC configuration by network equipment, for example.

In network equipment embodiments, a method may involve such operations as determining, by network equipment in a wireless communication network that further includes a first UE and a second UE, that a data block is to be transmitted to the second UE; and concurrently transmitting the data block at 2014 to at least the first UE and the second UE according to a data block retransmission mechanism to enable the second UE to identify the data block transmitted from the first UE and from the network equipment as being multiple concurrent transmissions of the data block according to the data block retransmission mechanism. The concurrent transmissions of the data block are processable by the second UE in combination to determine a reception status of the data block at 2026. The network equipment operations in FIG. 20 also include configuring UEs for UC at 2012.

Further features disclosed herein may also or instead be implemented in conjunction with such methods. For example, at least some features listed or otherwise disclosed herein for CUE operations may also or instead be applied to TUE embodiments or network equipment embodiments.

Embodiment disclosed herein encompass data block retransmission mechanisms based on UE cooperation. A TUE maintains multiple links, which may include a Uu link and one or more sidelinks, or multiple sidelinks without a Uu link, in parallel. A TUE is signaled or otherwise provided with a configuration to determine which PDSCH and PSSCH carry the same data block in some embodiments, and the TUE may also generate and transmit HARQ-ACK feedback based on combined decoding result, from PDSCH and PSSCH for example.

Mechanisms to identify or determine data block transmissions that can be combined include at least the following examples disclosed herein: based on any one or more of HARQ process, slots, beams, and PRB sets.

UE cooperation mechanisms for data block retransmission include mechanisms based on targeted PDCCH monitoring and mechanisms based on UE modes defining helping/non-helping time periods, each of which is disclosed by way of example herein.

Some embodiments may involve signaling of UE capability to network equipment, to signal that a UE supports UE cooperation and can be configured for UE cooperation.

TUE behaviors as disclosed herein include common data block reception from different physical channel transmissions, and combined HARQ-ACK reporting for such common data block reception.

CUE behaviors as disclosed herein include PDCCH monitoring of PDCCH transmissions intended to target UEs and UC cycles with one or more helper time and one or more non-helper time periods for power consumption management.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although the present disclosure concentrates primarily on wireless communication networks and UE cooperation for downlink communications from network equipment to a UE, for example, embodiments may potentially be applied to other scenarios, such as in other wireless networks (e.g., Wi-Fi, Non-Terrestrial Networks (NTNs)), and involve only UEs or only network nodes.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

The invention claimed is:

1. A method comprising:
receiving, by a first User Equipment (UE) in a wireless communication network, a transmission comprising a data block that is destined for a second UE in the wireless communication network;
transmitting the data block from the first UE toward the second UE according to a data block retransmission mechanism, the transmitted data block being one of a plurality of transmissions of the data block, and the plurality of transmissions of the data block preceding any negative acknowledgement (NACK) feedback being sent by the second UE for the data block, wherein the transmitting enables the second UE to identify the data block transmitted from the first UE as being one of the plurality of transmissions of the data block, to combine the plurality of transmissions of the data block together, and to generate acknowledgement / negative acknowledgement (ACK/NACK) feedback for the data block based on the combined plurality of transmissions of the data block, wherein the transmitting comprises transmitting the data block using an antenna port, to enable the second UE to identify the data block transmitted from the first UE as being one of the plurality of transmissions of the data block based on (i) the antenna port indicated by Transmission Configuration Indicator (TCI) state in Sidelink Control Information (SCI) and (ii) an antenna port indicated by TCI state in Downlink Control Information (DCI).

2. The method of claim 1, further comprising:
receiving, by the first UE from network equipment in the wireless communication network, signaling indicative of a configuration of the first UE for the data block retransmission mechanism.

3. The method of claim 1,
wherein the data block retransmission mechanism comprises a Hybrid Automatic Repeat Request (HARQ) mechanism associated with a HARQ identifier,
wherein the plurality of transmissions of the data block comprise an indication of the HARQ identifier to enable the second UE to identify the data block transmitted from the first UE as being one of the plurality of transmissions of the data block based on the HARQ identifier.

4. The method of claim 1, wherein the plurality of transmissions of the data block are in time slots that have a time offset relative to each other, to enable the second UE to identify, based on the time offset, the data block transmitted from the first UE as being one of the plurality of transmissions of the data block.

5. The method of claim 1, wherein the plurality of transmissions of the data block comprise the data block transmitted from the first UE, and one or both of: a transmission of the data block to the second UE by network equipment in the wireless communication network and a transmission of the data block to the second UE by a third UE in the wireless communication network.

6. A computer program product comprising a non-transitory computer readable storage medium storing programming, the programming including instructions to perform a method comprising:
receiving, by a first User Equipment (UE) in a wireless communication network, a transmission comprising a data block that is destined for a second UE in the wireless communication network;
transmitting the data block toward the second UE according to a data block retransmission mechanism, the transmitted data block being one of a plurality of transmissions of the data block, and the plurality of transmissions of the data block preceding any negative acknowledgement (NACK) feedback being sent by the second UE for the data block, wherein the transmitting enables the second UE to identify the data block transmitted from the first UE as being one of the plurality of transmissions of the data block, to combine the plurality of transmissions of the data block together, and to generate acknowledgement / negative acknowledgement (ACK/NACK) feedback for the data block based on the combined plurality of transmissions of the data block, wherein the transmitting comprises transmitting the data block using an antenna port, to enable the second UE to identify the data block transmitted from the first UE as being one of the plurality of transmissions of the data block based on (i) the antenna port indicated by Transmission Configuration Indicator (TCI) state in Sidelink Control Information (SCI) and (ii) an antenna port indicated by TCI state in Downlink Control Information (DCI).

7. An apparatus comprising:
a communication interface;
a processor, coupled to the communication interface;
a non-transitory computer readable storage medium, coupled to the processor, storing programming for execution by the processor, the programming including instructions that, when executed by the processor, cause the processor to:
receive, by a first User Equipment (UE) in a wireless communication network, a transmission comprising a data block that is destined for a second UE in the wireless communication network;
transmit the data block toward the second UE according to a data block retransmission mechanism, the transmitted data block being one of a plurality of transmissions of the data block, and the plurality of transmissions of the data block preceding any negative acknowledgement (NACK) feedback being sent by the second UE for the data block, wherein transmitting the data block enables the second UE to identify the data block transmitted from the first UE as being one of the plurality of transmissions of the data block, to combine the plurality of transmissions of the data block together, and to generate acknowledgement / negative acknowledgement (ACK/NACK) feedback for the data block based on the combined plurality of transmissions of the data block,
wherein the instructions, when executed by the processor, cause the processor to transmit the data block by transmitting the data block using an antenna port, to enable the second UE to identify the data block transmitted from the first UE as being one of the plurality of transmissions of the data block based on (i) the antenna port indicated by Transmission Configuration Indicator (TCI) state in Sidelink Control Information (SCI) and (ii) an antenna port indicated by TCI state in Downlink Control Information (DCI).

8. The apparatus of claim 7, the programming further including instructions that, when executed by the processor, cause the processor to:
receive, by the first UE from network equipment in the wireless communication network, signaling indicative of a configuration of the first UE for the data block retransmission mechanism.

9. The apparatus of claim 7,
wherein the data block retransmission mechanism comprises a Hybrid Automatic Repeat Request (HARQ) mechanism associated with a HARQ identifier,
wherein the plurality of transmissions of the data block comprise an indication of the HARQ identifier to enable the second UE to identify the data block transmitted from the first UE as being one of the plurality of transmissions of the data block based on the HARQ identifier.

10. The apparatus of claim 7, wherein the plurality of transmissions of the data block are in time slots that have a time offset relative to each other, to enable the second UE to identify, based on the time offset, the data block transmitted from the first UE as being one of the plurality of transmissions of the data block.

11. The apparatus of claim 7, wherein the plurality of transmissions of the data block comprise the data block transmitted from the first UE, and one or both of: a transmission of the data block to the second UE by network equipment in the wireless communication network and a transmission of the data block to the second UE by a third UE in the wireless communication network.

12. A method comprising:
receiving, by a second User Equipment (UE) in a wireless communication network, a plurality of transmissions of a data block that is destined for the second UE, the plurality of transmissions comprising a transmission of the data block toward the second UE by a first UE according to a data block retransmission mechanism, and the plurality of transmissions of the data block preceding any negative acknowledgement (NACK) feedback being sent by the second UE for the data block, the transmission of the data block by the first UE using an antenna port to enable the second UE to identify the transmission of the data block using by the first UE as being one of the plurality of transmissions of the data block, based on (i) the antenna port used in transmitting the data block and indicated by Transmission Configuration Indicator (TCI) state in Sidelink Control Information (SCI) and (ii) an antenna port indicated by TCI state in Downlink Control Information (DCI);
combining, by the second UE, the plurality of transmissions of the data block together; and
generating, by the second UE, acknowledgement / negative acknowledgement (ACK/NACK) feedback for the data block based on the combined plurality of transmissions of the data block.

13. The method of claim 12, further comprising:
receiving, by the second UE from network equipment in the wireless communication network, signaling indicative of a configuration of the second UE for the data block retransmission mechanism.

14. The method of claim 12,
wherein the data block retransmission mechanism comprises a Hybrid Automatic Repeat Request (HARQ) mechanism associated with a HARQ identifier,
wherein the plurality of transmissions of the data block comprise an indication of the HARQ identifier to enable the second UE to identify the data block transmitted from the first UE as being one of the plurality of transmissions of the data block based on the HARQ identifier.

15. The method of claim 12, wherein the plurality of transmissions of the data block are in time slots that have a time offset relative to each other, to enable the second UE to identify, based on the time offset, the data block transmitted from the first UE as being one of the plurality of transmissions of the data block.

16. The method of claim 12, wherein the plurality of transmissions of the data block further comprise one or both of: a transmission of the data block to the second UE by network equipment in the wireless communication network and a transmission of the data block to the second UE by a third UE in the wireless communication network.

17. A computer program product comprising a non-transitory computer readable storage medium storing programming, the programming including instructions to perform a method comprising:
receive, by a second User Equipment (UE) in a wireless communication network, a plurality of transmissions of a data block that is destined for the second UE, the plurality of transmissions comprising a transmission of the data block toward the second UE by a first UE according to a data block retransmission mechanism, and the plurality of transmissions of the data block preceding any negative acknowledgement (NACK) feedback being sent by the second UE for the data block, the transmission of the data block by the first UE using an antenna port to enable the second UE to identify the transmission of the data block using by the first UE as being one of the plurality of transmissions of the data block, based on (i) the antenna port used in transmitting the data block and indicated by Transmission Configuration Indicator (TCI) state in Sidelink Control Information (SCI) and (ii) an antenna port indicated by TCI state in Downlink Control Information (DCI);
combine, by the second UE, the plurality of transmissions of the data block together; and
generate, by the second UE, acknowledgement / negative acknowledgement (ACK/NACK) feedback for the data block based on the combined plurality of transmissions of the data block.

18. An apparatus comprising:
a communication interface;
a processor, coupled to the communication interface;
a non-transitory computer readable storage medium, coupled to the processor, storing programming for execution by the processor, the programming including instructions that, when executed by the processor, cause the processor to:
receive, by a second User Equipment (UE) in a wireless communication network, a plurality of transmissions of a data block that is destined for the second UE, the plurality of transmissions comprising a transmission of the data block toward the second UE by a first UE according to a data block retransmission mechanism, and the plurality of transmissions of the data block preceding any negative acknowledgement (NACK) feedback being sent by the second UE for the data block, the transmission of the data block by the first UE using an antenna port to enable the second UE to identify the transmission of the data block using by the first UE as being one of the plurality of transmissions of the data block, based on (i) the antenna port used in transmitting the data block and indicated by Transmission Configuration Indicator (TCI) state in Sidelink Control Information (SCI) and (ii) an antenna port indicated by TCI state in Downlink Control Information (DCI);
combine, by the second UE, the plurality of transmissions of the data block together; and
generate, by the second UE, acknowledgement / negative acknowledgement (ACK/NACK) feedback for the data block based on the combined plurality of transmissions of the data block.

19. The apparatus of claim 18, the programming further including instructions that, when executed by the processor, cause the processor to:
receive, by the second UE from network equipment in the wireless communication network, signaling indicative of a configuration of the second UE for the data block retransmission mechanism.

20. The apparatus of claim 18,
wherein the data block retransmission mechanism comprises a Hybrid Automatic Repeat Request (HARQ) mechanism associated with a HARQ identifier,
wherein the plurality of transmissions of the data block comprise an indication of the HARQ identifier to enable the second UE to identify the data block transmitted from the first UE as being one of the plurality of transmissions of the data block based on the HARQ identifier.

21. The apparatus of claim 18, wherein the plurality of transmissions of the data block are in time slots that have a time offset relative to each other, to enable the second UE to identify, based on the time offset, the data block transmitted from the first UE as being one of the plurality of transmissions of the data block.

22. The apparatus of claim 18, wherein the plurality of transmissions of the data block further comprise one or both of: a transmission of the data block to the second UE by network equipment in the wireless communication network and a transmission of the data block to the second UE by a third UE in the wireless communication network.

\* \* \* \* \*